United States Patent
Guan et al.

(10) Patent No.: US 11,638,152 B2
(45) Date of Patent: Apr. 25, 2023

(54) IDENTIFYING AN ILLEGITIMATE BASE STATION BASED ON IMPROPER RESPONSE

(71) Applicant: QUALCOMM Incorporated, San Diego, CA (US)

(72) Inventors: Xuepan Guan, San Diego, CA (US); Subrato Kumar De, San Diego, CA (US); Nitin Pant, San Diego, CA (US); Mattias Kaulard Huber, Solana Beach, CA (US); Krishna Ram Budhathoki, San Diego, CA (US); Ankur Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 677 days.

(21) Appl. No.: 16/699,075

(22) Filed: Nov. 28, 2019

(65) Prior Publication Data
US 2021/0168615 A1 Jun. 3, 2021

(51) Int. Cl.
*H04L 29/06* (2006.01)
*H04L 29/08* (2006.01)
(Continued)

(52) U.S. Cl.
CPC ........... *H04W 12/122* (2021.01); *H04W 8/26* (2013.01); *H04W 12/06* (2013.01); *H04W 12/30* (2021.01); *H04W 60/00* (2013.01)

(58) Field of Classification Search
CPC ..... H04W 12/122; H04W 12/30; H04W 8/26; H04W 12/06
(Continued)

(56) References Cited

U.S. PATENT DOCUMENTS 10,064,048 B1 * 8/2018 Mui .................. H04W 8/26
10,826,854 B1 * 11/2020 Ledet .................. G06F 9/453
(Continued)

FOREIGN PATENT DOCUMENTS

AU 2007221910 A1 * 11/2007 ........... H04B 17/318
CN 106572450 A * 4/2017
(Continued)

OTHER PUBLICATIONS

International Search Report and Written Opinion—PCT/US2020/057763—ISA/EPO—dated Feb. 12, 2021.

*Primary Examiner* — Haresh N Patel
(74) *Attorney, Agent, or Firm* — The Marbury Law Group, PLLC

(57) ABSTRACT

Various embodiments include methods, components and wireless devices configured to identify illegitimate base station. The processor of the wireless device may determine that a device in communication with the wireless device is a suspect base station. The processor may send a fabricated message to the device, and may receive one or more response messages from the device. The processor may determine whether one or more of the response messages received from the device is an appropriate response or an inappropriate response to the fabricated message. In response to determining that a response message is an inappropriate response, the processor may determine that the device is an illegitimate base station. In response to determining that the device is an illegitimate base station, the wireless device may perform a protective action.

30 Claims, 14 Drawing Sheets

(51) Int. Cl.
  *H04W 12/122* (2021.01)
  *H04W 12/30* (2021.01)
  *H04W 8/26* (2009.01)
  *H04W 12/06* (2021.01)
  *H04W 60/00* (2009.01)

(58) Field of Classification Search
  USPC .......................................................... 726/22
  See application file for complete search history.

(56) References Cited

U.S. PATENT DOCUMENTS

2018/0013568 A1* 1/2018 Muhanna .............. H04L 9/0825
2019/0059032 A1  2/2019 Han et al.
2020/0162925 A1* 5/2020 Miao ..................... H04W 12/66
2020/0178065 A1* 6/2020 Huber .................. H04L 63/1466

FOREIGN PATENT DOCUMENTS

| | | | | |
|---|---|---|---|---|
| CN | 108616880 A | * | 10/2018 | ............ H04W 12/04 |
| CN | 108738093 A | * | 11/2018 | ........ H04W 36/0083 |
| CN | 108738093 A | * | 11/2018 | |
| CN | 105101200 B | | 5/2019 | |
| CN | 113170307 A | * | 7/2021 | ......... H04L 63/1425 |
| ES | 2824527 T3 | * | 5/2021 | |
| GB | 2560357 A | | 9/2018 | |
| KR | 20200033866 A | * | 3/2020 | |
| KR | 102315881 B1 | * | 10/2021 | |
| WO | WO-2018030866 A1 | * | 2/2018 | ............ H04W 12/04 |

* cited by examiner

IDENTIFYING AN ILLEGITIMATE BASE STATION BASED ON IMPROPER RESPONSE

BACKGROUND

Wireless devices typically access a communication network via communications with a base station. In many instances the base station is a device that is previously unknown to the wireless device. The processes used by wireless devices to identify and establish communication with a base station provide a potential security vulnerability for the wireless device. For example, a malicious device may present itself as a legitimate base station, and may establish communication with the wireless device. The wireless device may then be vulnerable to data theft, a download of malicious software, or interception of its communications by the illegitimate base station.

SUMMARY

Various aspects include methods that may enable a processor of a wireless device to determine whether a device in communication with the wireless device is an illegitimate base station or a legitimate base station, and perform appropriate actions accordingly. Various aspects may include sending a fabricated message to a device in communication with the wireless device in response to determining that the device is a suspect base station, receiving a response message from the device, determining whether the response message is an appropriate response or an inappropriate response to the fabricated message, determining that the device is an illegitimate base station in response to determining that the response message is an inappropriate response to the fabricated message, and performing a protective action in response to determining that the device is an illegitimate base station. In some aspects, the fabricated message may include an area update message that includes a fabricated Temporary Mobile Subscriber Identity (TMSI). In some aspects, the fabricated TMSI may include a fabricated TMSI without integrity protection.

In some aspects, an appropriate response may include an identity request message, and an inappropriate response may include a message that does not include an identity request message. Some aspects may include, determining whether an International Mobile Subscriber Identity (IMSI) was sent to the device in response to receiving a message from the device, and performing one or more authentication operations in response to determining that an IMSI was sent to the device, wherein determining that the device is an illegitimate base station in response to determining that the response message is an inappropriate response to the fabricated message may include determining that the device is an illegitimate base station in response to determining that an IMSI was not sent to the device.

Some aspects may including performing one or more authentication operations when message received from the device is an identity request message, in which the authentication operations may include receiving an authentication request message from the device, determining whether the authentication request message can be verified, determining that the device is a legitimate base station in response to determining that the authentication request message can be verified, and determining that the device is an illegitimate base station in response to determining that the authentication request message cannot be verified.

In some aspects, sending the fabricated message may include sending a service request message that includes at least one of a fabricated response (RES) value, a fabricated cipher key sequence number (CKSN), or a key set ID, the appropriate response may include a service reject message, and the inappropriate response may include a service accept message. Some aspects may include determining whether an International Mobile Subscriber Identity (IMSI) was sent to the device, and attempting to re-register with the device in response to determining that an IMSI was sent to the device, and determining that the device is an illegitimate base station in response to determining that the response message is an inappropriate response to the fabricated message may include determining that the device is an illegitimate base station in response to determining that an IMSI was not sent to the device.

In some aspects, sending the fabricated message to the device may include sending an authentication response including the fabricated message. In such aspects, attempting to re-register with the device may include sending an attach request message to the device, and receiving an authentication request from the device. In such aspects, determining that the device is an illegitimate base station in response to determining that the response message is an inappropriate response to the fabricated message may include deter mining that the device is an illegitimate base station in response to determining that the response message includes an attach accept message, and determining that the device is a legitimate base station in response to determining that the response message includes an authentication reject message.

Some aspects may include receiving an emergency message from the device, and sending a message invoking a service to the device, wherein determining that the device is an illegitimate base station in response to determining that the response message is an inappropriate response to the fabricated message may include determining whether the device is an illegitimate base station based on a response to the message invoking the service that is received from the device. Some aspects may include determining that the device is a legitimate base station in response to determining that the response to the message invoking the service includes a positive response. Some aspects may include performing a soft reset operation in response to determining that the device is a legitimate base station. Some aspects may include simulating removal and re-insertion of a universal integrated circuit card (UICC) containing a universal SIM (USIM) card in response to determining that the device is a legitimate base station.

In some aspects, sending a fabricated message to the device may include the wireless device sending one or more fabricated messages to the device. In some aspects, receiving a response message from the device may include receiving more than one response from the device, and determining whether the response message is an inappropriate response to the fabricated message may include determining whether any one or more of the received response messages is an inappropriate response.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of the methods summarized above. Further aspects include a system on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 1 is a component block diagram of a wireless device suitable for implementing any of the various embodiments.

DETAILED DESCRIPTION

Figure 1:
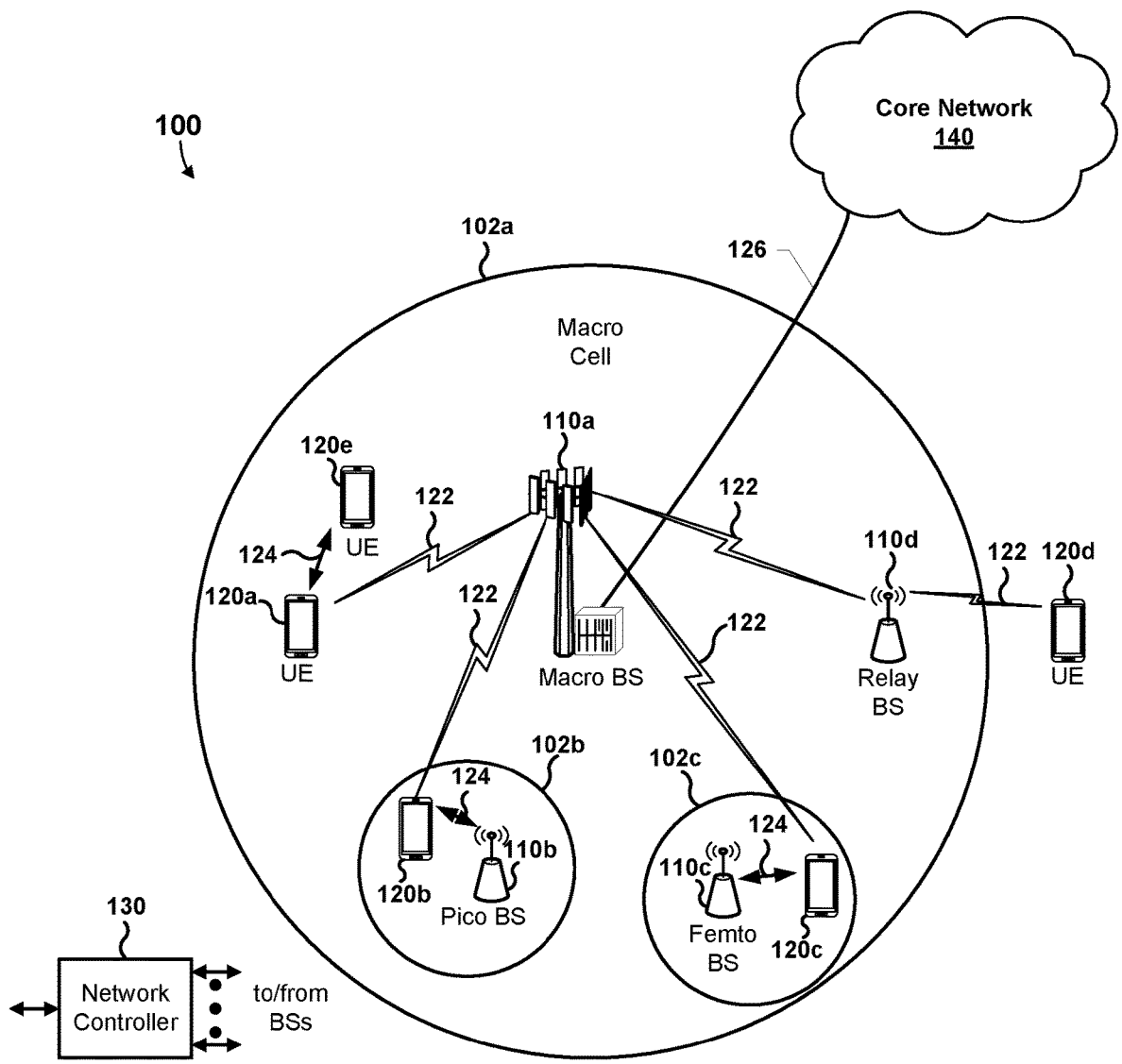
FIG. 1 is a system block diagram conceptually illustrating an example communications system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and wireless devices configured to use the methods to identify an illegitimate base station. In some embodiments, the processor of the wireless device may determine that the device is a suspect base station, and the processor of the wireless device may send one or more fabricated messages to the device. Based on a response message or more than one response message received from the device responding to the one or more fabricated messages, the processor of the wireless device may determine that the suspect base station is either an illegitimate base station or a legitimate base station. In various embodiments, the wireless device may construct and use the fabricated messages in a manner that the other device is unable to determine whether the fabricated messages are test messages, and thus the other device is unable to recognize that it is being tested by the wireless device.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, digital signal processor (DSP) core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The term "purported base station" is used herein to refer to a device that transmits information received by the computing device indicating that the device is a legitimate base station or similar access point to a network, the veracity of which has not yet been determined.

The term "illegitimate base station" is used herein to refer to a device that purports to be a legitimate base station, but in fact is a rogue or malicious device that could make use of a wireless communication link established with a computing device to perform a malicious act on or using the computing device. An illegitimate base station may attempt to pass itself off as being a base station provided or deployed by a known entity (e.g., network operator, infrastructure provider, etc.) when in fact the base station device is actually operated or deployed by a different entity that may be malicious in nature. For example, an attacker might position a wireless computing device configured to function as a rogue access point inside or near a company network to attempt man-in-the-middle attacks, such as to steal confidential information or modify messages in transit. As another example, an attacker might position a wireless computing device configured to function as a rogue access point at or near a public location where members of the public typically access open access points, such as at an airport or a coffee shop.

The term "suspect base station" is used herein to refer to a purported base station that a wireless device has determined to be a potential fake base station.

The term "legitimate base station" is used herein to refer to a device that is a true, benign, or legitimate base station or similar network access point.

Base stations provide wireless devices with access to communication networks, such as the Internet, which provides great utility to users. However, the mechanisms for wirelessly connecting to communication networks present potential security vulnerabilities for wireless devices. In many cases, a base station is unknown to the wireless device when a wireless connection is established, such as the first time the wireless device accesses a base station in a new location (e.g., airport or coffee house). In such a situation, a computing device acting as an illegitimate base station could present itself as a legitimate base station, and the wireless device would have no history (e.g., a base station ID or other information that could be stored in memory) by which to distinguish the fake base station from the legitimate base station. If the wireless device then establishes a trusted communication link with the fake base station, that computing device could access and steal user data, download malicious software to the wireless device, send messages purporting to be from the wireless device to other devices to spread malicious content, or eavesdrop of the wireless device's communications.

Some wireless devices may be configured to identify an illegitimate base station by analyzing the initial communications between the wireless device and a purported base station, such as analyzing system information broadcast by the purported base station (e.g., master information block and system information block messages) or processes of establishing a communication link between the wireless device and the purported base station (e.g., messages received from the purported base station during an initial handshake process). However, such wireless devices may lack a mechanism for follow-up or subsequent analysis of the base station, especially to confirm whether an initial analysis was a false positive (i.e., incorrectly identifying a legitimate base station as an illegitimate base station) or a false negative (i.e., incorrectly identifying an illegitimate base station as a legitimate base station).

Various embodiments provide methods, and wireless devices configured to perform the methods, of identifying an illegitimate base station by performing operations to confirm the legitimacy of a base station or confirm an illegitimate base station. Various embodiments enable a wireless device to test the legitimacy of a purported base station without the purported base station being able to recognize that it is being tested by the wireless device. In some embodiments, a wireless device may determine that another device is a suspect base station, and based on that determination, send to the suspect base station one or more fabricated messages to elicit a response from the suspect base station that the wireless device can use to determine whether the suspect base station is fake or legitimate.

In various embodiments, a wireless device may determine that a device in communication with the wireless device is a suspect base station based upon a number of different fabricated messages and elicited responses. The wireless device may determine whether a response message is an appropriate response or an inappropriate response to the fabricated message sent to the device, and determine that the device is an illegitimate base station when the received response message is inappropriate.

In some embodiments, the fabricated message may include an area update message that includes a fabricated Temporary Mobile Subscriber Identity (TMSI). In various embodiments, the wireless device may fabricate the TMSI according to any protocol or communication standard, including 3GPP standards such as second generation (2G), third generation (3G), fourth generation (4G), and fifth generation (5G) standards. In some embodiments, the fabricated message may include a New Radio (NR) Registration Request message. In some embodiments, the area update message may include a tracking area update (TAU) message, a location area update (LAU) message, or a routing area update (RAU) message. In such embodiments, an appropriate response would include an identity request message, but an inappropriate response would not include an identity request message.

In some embodiments, such as appropriate for use in LTE/5G networks, if the wireless device receives a response including an identity request message from the device, the wireless device may determine whether the wireless device previously sent an International Mobile Subscriber Identity (IMSI) to the device. In some embodiments, in response to determining that an IMSI was not previously sent to the device, the wireless device may determine that the device is an illegitimate base station without further operations. In some embodiments, the wireless device may perform one or more authentication operations in response to determining that an IMSI was previously sent to the device, which may include receiving an authentication request message from the device, determining whether the authentication request message can be verified, and determining that the device is a legitimate base station in response to determining that the authentication request message can be verified. In some embodiments, the wireless device may determine that the device is an illegitimate base station in response to determining that the authentication request message cannot be verified. In some embodiments, a threat detection algorithm running on the wireless device may determine whether the IMSI was previously sent to the device.

In some embodiments, the fabricated message may include a service request message that includes a fabricated response (RES) value. In some embodiments, the fabricated message may include a service request message that includes a fabricated cipher key sequence number (CKSN). In some embodiments, the fabricated message may include a service request message that includes a fabricated key set ID. In such embodiments, an appropriate response would include a service reject message, but an inappropriate response would include a service accept message.

In some embodiments, such as appropriate for use in GSM networks, if the wireless device receives a response including an identity request message from the device, the wireless device may determine whether an IMSI was previously sent to the device, and may attempt to re-register with the device in response to determining that an IMSI was sent to the device. In some embodiments, in response to determining that an IMSI was not sent to the device, the wireless device may determine that the device is an illegitimate base station without further operations. In some embodiments, attempting to re-register with the device may include sending an attach request message to the device, receiving an authentication request from the device, and sending an authentication response including the fabricated message.

In some embodiments, determining that the device is an illegitimate base station in response to determining that one or more response messages received from the device is an inappropriate response to a fabricated message may include determining that the device is an illegitimate base station in response to determining that a response message includes an attach accept message. In some embodiments, the wireless device may determine that the device is a legitimate base station in response to determining that a response message includes an authentication reject message.

In some embodiments, in response to receiving an emergency message from the device, the wireless device may send a message invoking a service to the device, and the wireless device may determine whether the device is an illegitimate base station based on a response to the message invoking the service that is received from the device. In some embodiments, the wireless device may receive no response from the other device within a threshold period of time (e.g., within a timeout duration), and in response to determining that no response has been received within the threshold period of time the processor may determine that the device is an illegitimate base station. In some embodiments, the wireless device may determine that the device is a legitimate base station in response to receiving a positive response to the message invoking a service.

In some embodiments, the wireless device may perform a soft reset operation in response to deter mining that the device is a legitimate base station. In some embodiments, the wireless device may simulate a removal and re-insertion of a universal integrated circuit card (UICC) containing a universal SIM (USIM) card in response to deter mining that the device is a legitimate base station.

In some embodiments, sending a fabricated message to the device may include sending one or more fabricated messages to the device. In such embodiments, receiving a response message from the device may include receiving more than one response from the device. In such embodiments, determining whether the response message is an inappropriate response to the fabricated message may include determining whether any one or more of the received response messages is an inappropriate response.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of wireless devices (illustrated as wireless devices 120a-120e in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as an NodeB, a Node B, an LTE evolved nodeB (eNB), an access point (AP), a radio head, a transmit receive point (TRP), an NR base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE). In some embodiments, the wireless communication links 122 and 124 may include direct connection communication links that may be established over a PC5 interface in accordance with applicable 3GPP standards.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as an NR or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, a vehicle-to-pedestrian (V2P) protocol, or similar protocol), a mesh network, or similar networks, or combinations thereof. In this case, the wireless devices 120a-120e may perform scheduling operations, resource selection operations, as well as other operations described elsewhere herein as being performed by the base station 110a-110d.

In some implementations, the communication system 100 may include one or more devices configured to communicate as part of an intelligent transportation system (ITS). ITS technologies may increase intercommunication and safety for driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them.

C-V2X defines transmission modes that provide non-line-of-sight awareness and a higher level of predictability for enhanced road safety and autonomous driving. Such C-V2X transmission modes may include V2V, V2I, and V2P, and may utilize frequencies in a 5.9 gigahertz (GHz) spectrum that is independent of a cellular network. C-V2X transmission modes may also include vehicle-to-network communications (V2N) in mobile broadband systems and technologies, such as 3G mobile communication technologies (e.g., GSM evolution (EDGE) systems, CDMA 2000 systems, etc.), 4G communication technologies (e.g., LTE, LTE-Advanced, WiMAX, etc.), as well as 5G systems.

Figure 2:
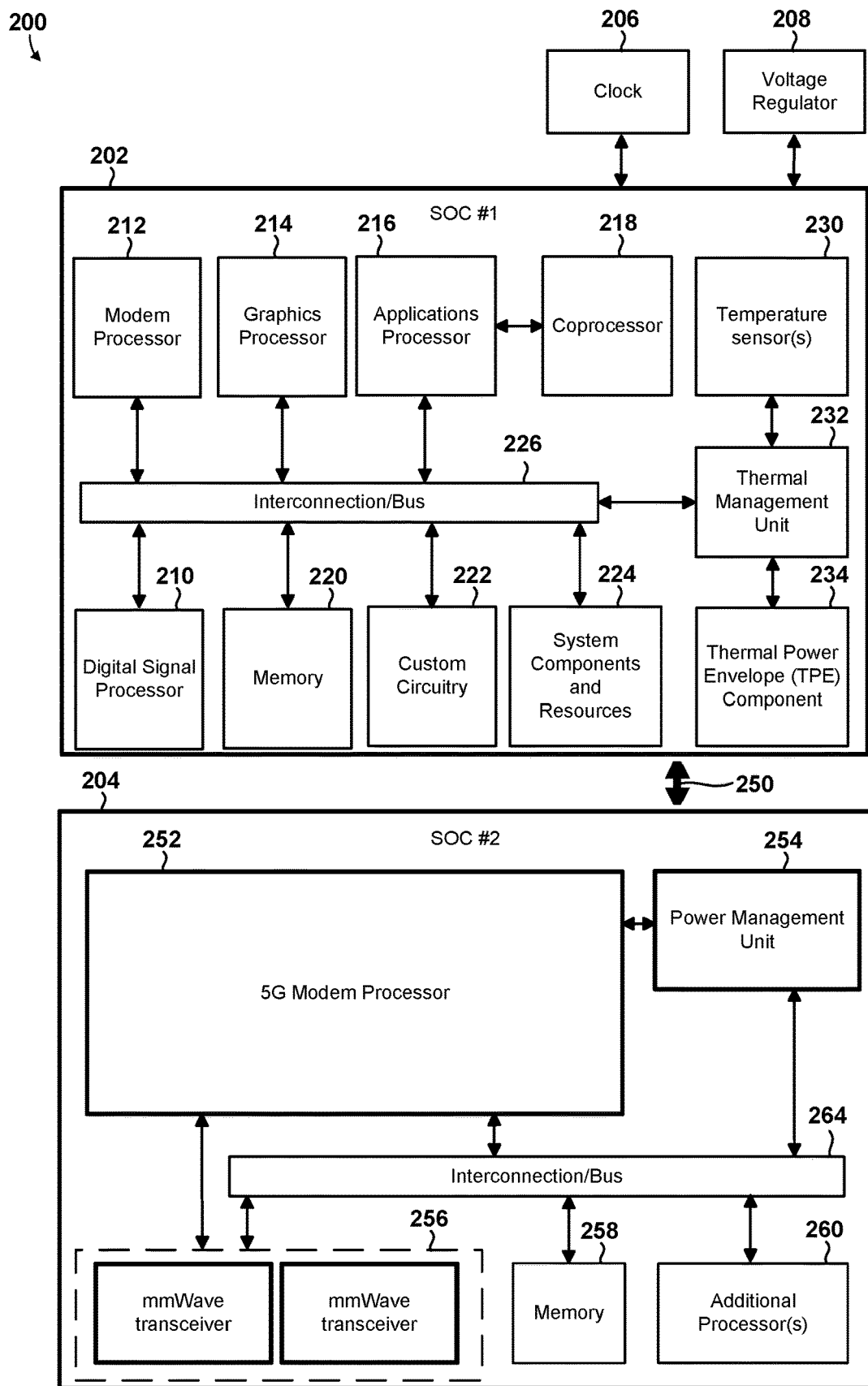
FIG. 2 is a component block diagram illustrating wireless device components suitable for implementing any of the various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices implementing various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of a wireless device (e.g., the wireless devices 120a-120e) that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
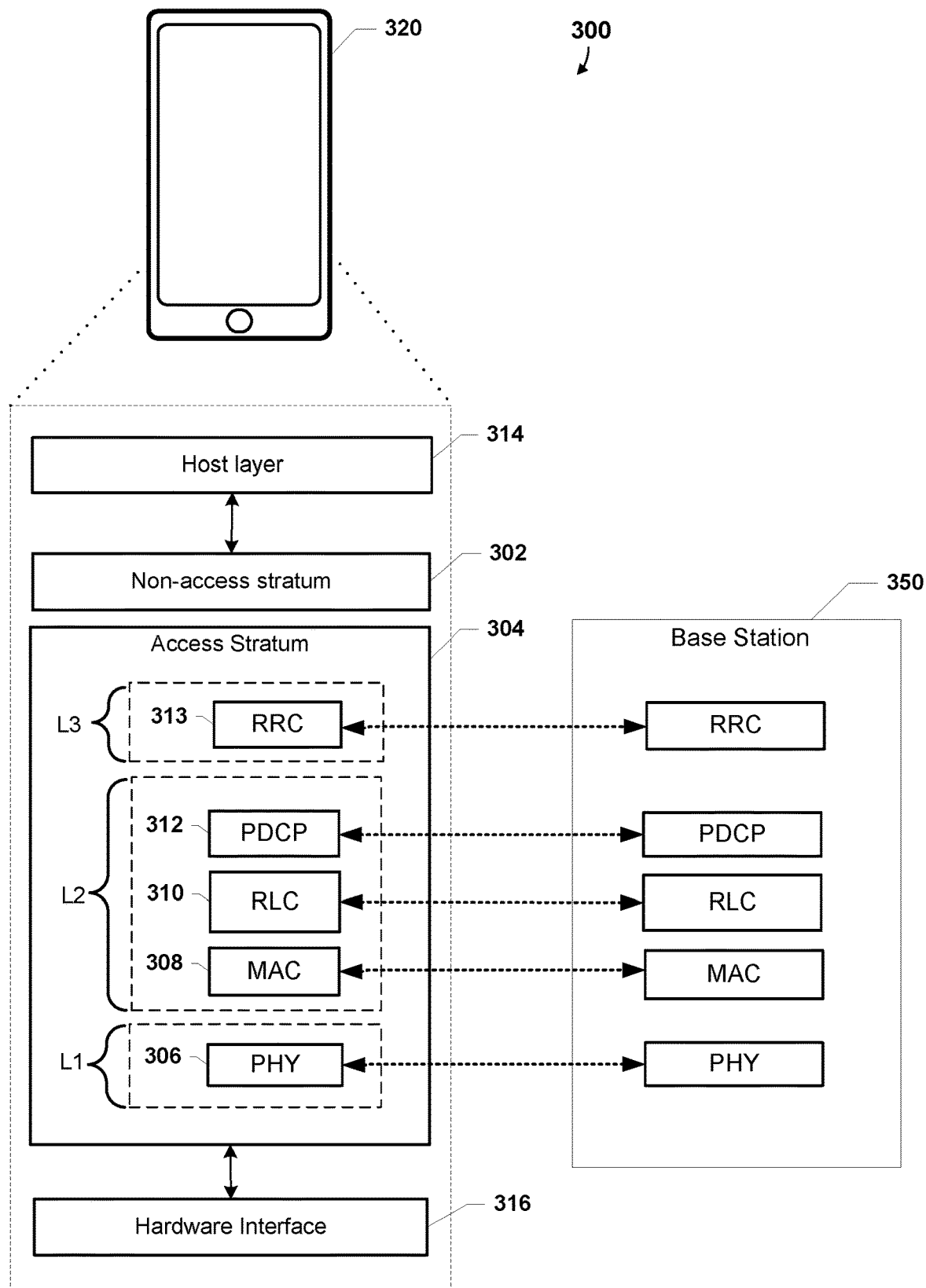
FIG. 3 is a diagram illustrating an example of a software architecture including a radio protocol stack for the user and control planes in wireless communications suitable for implementing any of the various embodiments.

FIG. 3 illustrates an example of a software architecture 300 including a radio protocol stack for the user and control planes in wireless communications between a base station 350 (e.g., the base station 110a) and a wireless device 320 (e.g., the wireless devices 120a-120e, 200). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-subscriber identity module (SIM) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the physical downlink control channel (PDCCH) and the physical downlink shared channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Re-transmissions of missing or erroneously received data units in an LTE wireless network are handled primarily by the HARQ mechanism in the MAC layer, complemented by the ARQ retransmission functionality of the RLC layer in LTE. This two-level retransmission structure is a result of the trade-off between fast and reliable feedback of the status reports. In particular, the HARQ mechanism provides very fast retransmission which may be suitable for high speeds used in LTE, whereas the ARQ is responsible for reliability. Usually HARQ handles the majority of transmission errors but sometimes the mechanism fails, in which case ARQ may be needed.

Specifically, HARQ feedback is fast and frequent to correct transmission errors as soon as possible. In this manner, the end-to-end round-trip time (RTT) for HARQ is low. The HARQ processes may involve a synchronous one-bit ACK/NACK signal that is sent every transmission attempt, the timing of which is used by the network to identify the corresponding data transmission. However, since the binary feedback at the HARQ level is susceptible to transmission errors, the additional ARQ protocol provides a reliable (but slower) feedback. Typically, ARQ processes involve asynchronous RLC status reports that contain explicit sequence numbers, which are protected by a cyclic redundancy check (CRC). Compared to HARQ, RLC status reports in ARQ processes are transmitted relatively infrequently and thus the cost of obtaining reliability is relatively small.

Figure 4:
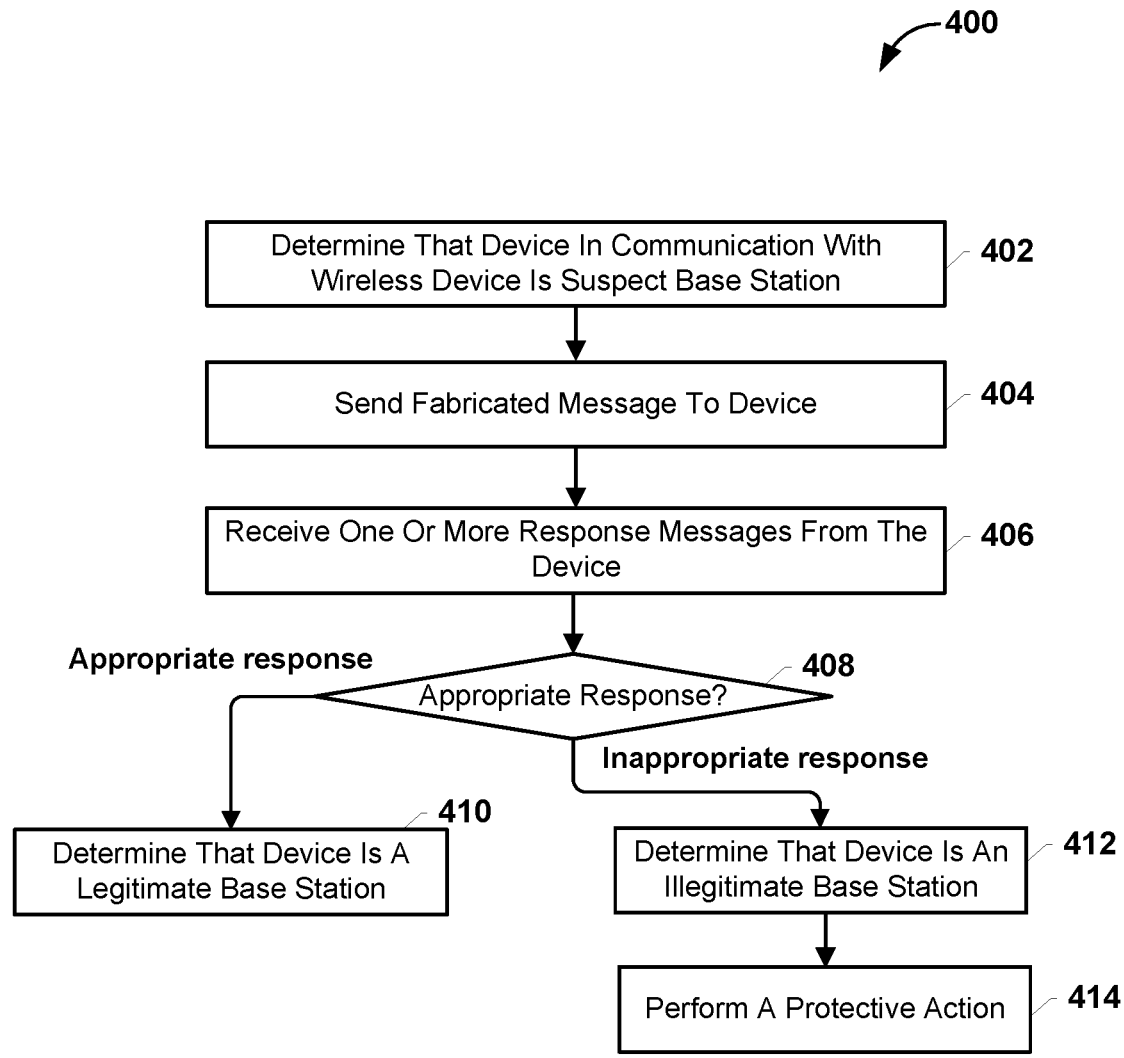
FIG. 4 is a process flow diagram illustrating a method of identifying an illegitimate base station in accordance with various embodiments.

FIG. 4 illustrates a method 400 of identifying an illegitimate base station performed by a processor of a wireless device according to various embodiments. With reference to FIGS. 1-4, the method 400 may be implemented in hardware components and/or software components of a wireless device (e.g., the wireless device 120a-120e, 200, 320), the operation of which may be controlled by one or more processors (e.g., the processors 212, 214, 216, 218, 252, and 260) of the wireless device.

In block 402, the processor may determine that a device in communication with the wireless device is a suspect base station. For example, the processor may receive one or more messages from a device indicating that the device is a purported base station. In some embodiments, the processor may determine that the device is a suspect base station using a threat detection algorithm, such as a threat score algorithm or another suitable algorithm. For example, a threat detection algorithm executing on the wireless device may be configured to use various types of information to dynamically scale up or down a threat score for the observed purported base station. An example of information that a threat detection algorithm may consider in dynamically adjusting a threat score of is system information broadcast by an observed purported base station, such as the Cell ID, the location area code (LAC), the tracking area code (TAC), Evolved UMTS Terrestrial Radio Access (UTRA) Absolute Radio Frequency Channel Number (EARFCN), etc.

Another example of information that a threat detection algorithm may consider in dynamically adjusting a threat score are the protocol interaction and activities (e.g., ID request, RRC Reject, TAC Reject) between the wireless device and the observed device. Another example of information that a threat detection algorithm may consider in dynamically adjusting a threat score is the contextual and environmental information in which the wireless device is operating when the activities between the wireless device and the observed device occur. In some embodiments, based on a determined threat level (for example, based on an absolute score, or based on a comparison of a threat score to a threat score threshold), the processor may determine that the device and communication with the wireless device is a suspect base station.

In block 404, the processor may send a fabricated message to the device. For example, as further described herein, the processor may send a message that includes content that is intentionally falsified, garbled, or otherwise improper. In various embodiments, the purpose of the fabricated message is not to convey particular information to the base station, but to elicit a response from the suspect base station that the processor can evaluate to determine whether the base station is legitimate or an illegitimate. An illegitimate base station will not possess a shared secret with the wireless device (e.g., a k value, or another suitable shared secret), nor will the illegitimate base station possess any values derived from the shared secret, nor will the illegitimate base station be able to generate any values derived from the shared secret. Therefore, an illegitimate base station will be unable to determine that information sent by the wireless device is fabricated (i.e., falsified, garbled, or otherwise improper). In contrast, a legitimate base station will be able to readily identify a fabricated message from the wireless device In block 406, the processor may receive a response message from the device.

In determination block 408, the processor may determine whether the response message is an appropriate response or an inappropriate response to the fabricated message. In some situations, the device may transmit more than one response message, and the processor may determine whether any one or more of the received response messages is an appropriate response or an inappropriate response to the fabricated message. As further described herein, the processor may determine whether any response message(s) constitutes a response that would be expected from a legitimate base station (which is referred to herein as an "appropriate response"), or a response that is improper, unexpected, atypical, or something other than a response that would be provided by a legitimate base station (which is referred to herein as an "inappropriate response").

In response to determining that a response message is an appropriate response (i.e., determination block 408="Yes"), the processor may determine that the device is a legitimate base station in block 410. In that case, the processor may proceed with normal communication protocols.

In response to determining that a response message is an inappropriate response (i.e., determination block 408="No"), the processor may determine that the device is an illegitimate base station in block 412.

In block 414, the processor may perform a protective action in response to determining that the device is an illegitimate base station. Non-limiting examples of protective actions that the processor may perform include cell barring, cell de-prioritization performing a soft reset and attempting to reconnect to a legitimate base station, updating one or more communication parameters to access the communication network using a different frequency, band or system, monitoring activities of the network entity, and reporting the activities of the device to a security server of the communication network. In some embodiments, the processor may perform two or more protective actions.

FIGS. 5A-5E are signal flow diagrams illustrating methods of identifying an illegitimate base station in accordance with various embodiments. With reference to FIGS. 1-5E, the methods 500A-500E may be implemented in hardware components and/or software components of a wireless device (e.g., the wireless device 120a-120e, 200, 320), the operation of which may be controlled by one or more processors (e.g., the processors 212, 214, 216, 218, 252, and 260) of the wireless device.

Figure 5A:
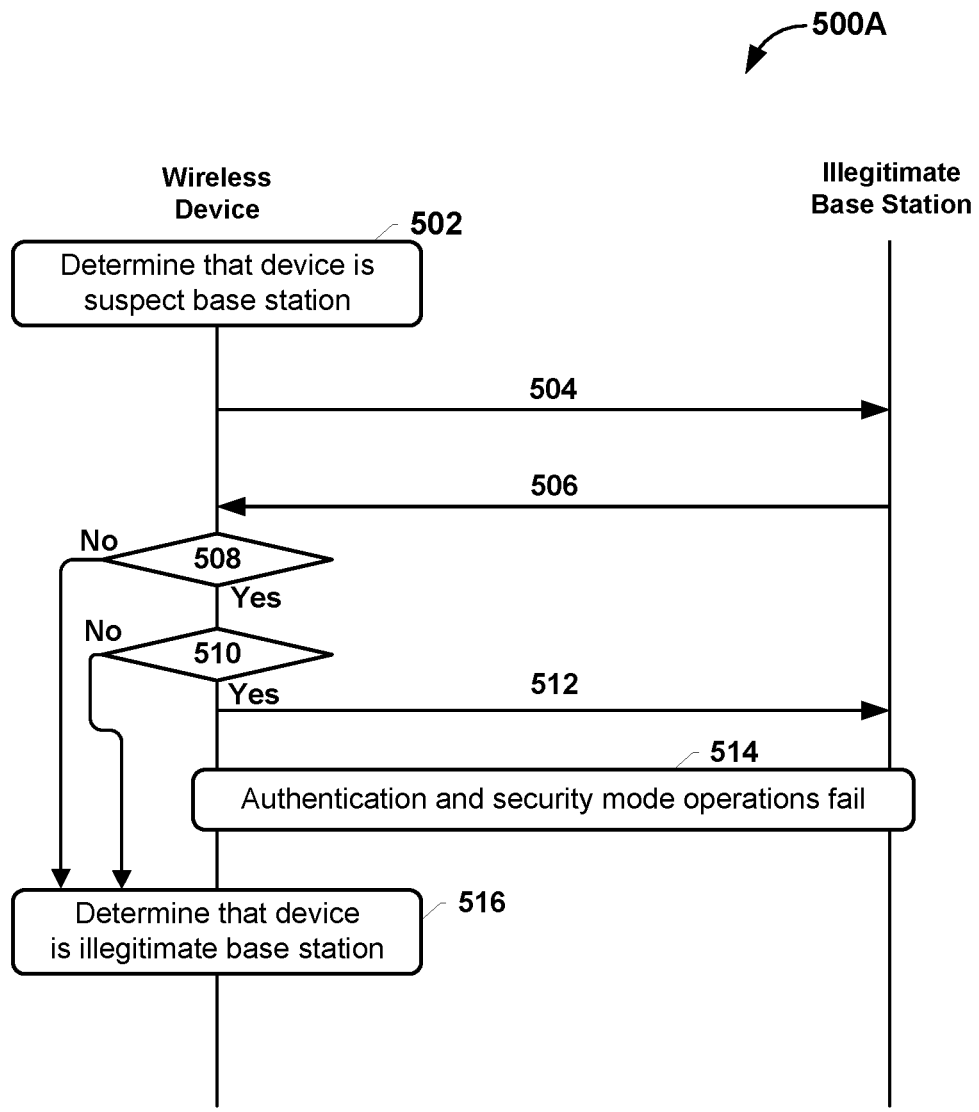
FIGS. 5A-5E are signal flow diagrams illustrating methods of identifying an illegitimate base station in accordance with various embodiments.

Referring to FIG. 5A, the method 500A may enable a wireless device to identify an illegitimate base station. In some embodiments, the method 500A may be used in 4G or 5G network applications (e.g., in an LTE network, a 5G NR network, or another suitable network environment).

In operation 502, the processor of the wireless device may determine that the device in communication with the wireless device is a suspect base station, such as described for block 402 of the method 400 (FIG. 4).

In response to determining that the device in communication with the wireless device is a suspect base station, the processor of the wireless device may send to the device a fabricated message 504. For example, the processor of the wireless device may send an area update message, such as a TAU, LAU, or RAU message, to the device. The area update message may include fabricated information, such as a fabricated TMSI. Because the TMSI is fabricated by the wireless device, the TMSI should be unknown to the device. In some embodiments, the fabricated TMSI is without (i.e., does not include, is not sent with) integrity protection. For example, the processor of wireless device may send the fabricated TMSI without integrity protection if the wireless device does not have a previous security context. In some embodiments, integrity protection may only apply to the access strata (for example, in a 3G implementation). In some embodiments, integrity protection may apply to both an access strata and a non-access strata (for example, in a 4G or 5G implementation). If the device is a legitimate base station, the processor of the wireless device should expect to receive certain proper response(s). For example, a legitimate base station would attempt to determine the wireless device's security context, and if the security context can be found, the legitimate base station would send a security mode command to elicit a further integrity check message from the wireless device. In contrast, an illegitimate base station will be unable to determine that the fabricated TMSI is a fabricated message.

Prompted by the fabricated message 504, the device may transmit a response message 506 that is received by the wireless device.

In determination block 508, the processor of the wireless device may determine whether the response message 506 includes an identity request message. For example, in some scenarios, a relatively unsophisticated illegitimate base station may respond with a message that does not include an identity request. Such a response would be inappropriate and thus immediately expose the device as an illegitimate base station.

In response to determining that the response message 506 does not include an identity request message (i.e., determination block 508="No"), the processor may determine that the device is an illegitimate base station in block 516, and perform a protective action, such as one or more operations of block 414 of the method 400 as described with reference to FIG. 4.

However, a relatively sophisticated illegitimate base station, as well as a legitimate base station, may send a message including an identity request message in response message 506. Therefore, in response to determining that the response message 506 includes an identity request message (i.e., determination block 508="Yes"), the processor may determine whether the wireless device has previously sent an IMSI to the device in determination block 510. In some embodiments, IMSI information may enable a legitimate base station to authenticate the wireless device. If the wireless device has previously provided IMSI information to the device, resending the IMSI information does not pose a further threat to the wireless device. In some embodiments, a threat determination algorithm executing on the wireless device may determine whether the wireless device has previously sent the IMSI to the device.

In response to determining that the wireless device has not previously sent an IMSI to the device (i.e., determination block 510="No"), the processor may determine that the device is an illegitimate base station in block 516, and perform a protective action, such as one or more operations of block 414 of the method 400 as described with reference to FIG. 4.

In response to determining that the wireless device has previously sent an IMSI to the device (i.e., determination block 510="Yes"), the processor may send an identity response message 512. For example, the processor may send a message including the IMSI (i.e., the previously-sent IMSI).

In some embodiments, the processor may then perform one or more authentication and/or security mode operations 514. In the example illustrated in FIG. 5A, the authentication and/or security mode operations fail. In response to failure of the authentication and/or security mode operations, the processor of the wireless device may determine that the device is an illegitimate base station in block 516, and perform a protective action, such as one or more operations of block 414 of the method 400 as described with reference to FIG. 4.

Figure 5B:
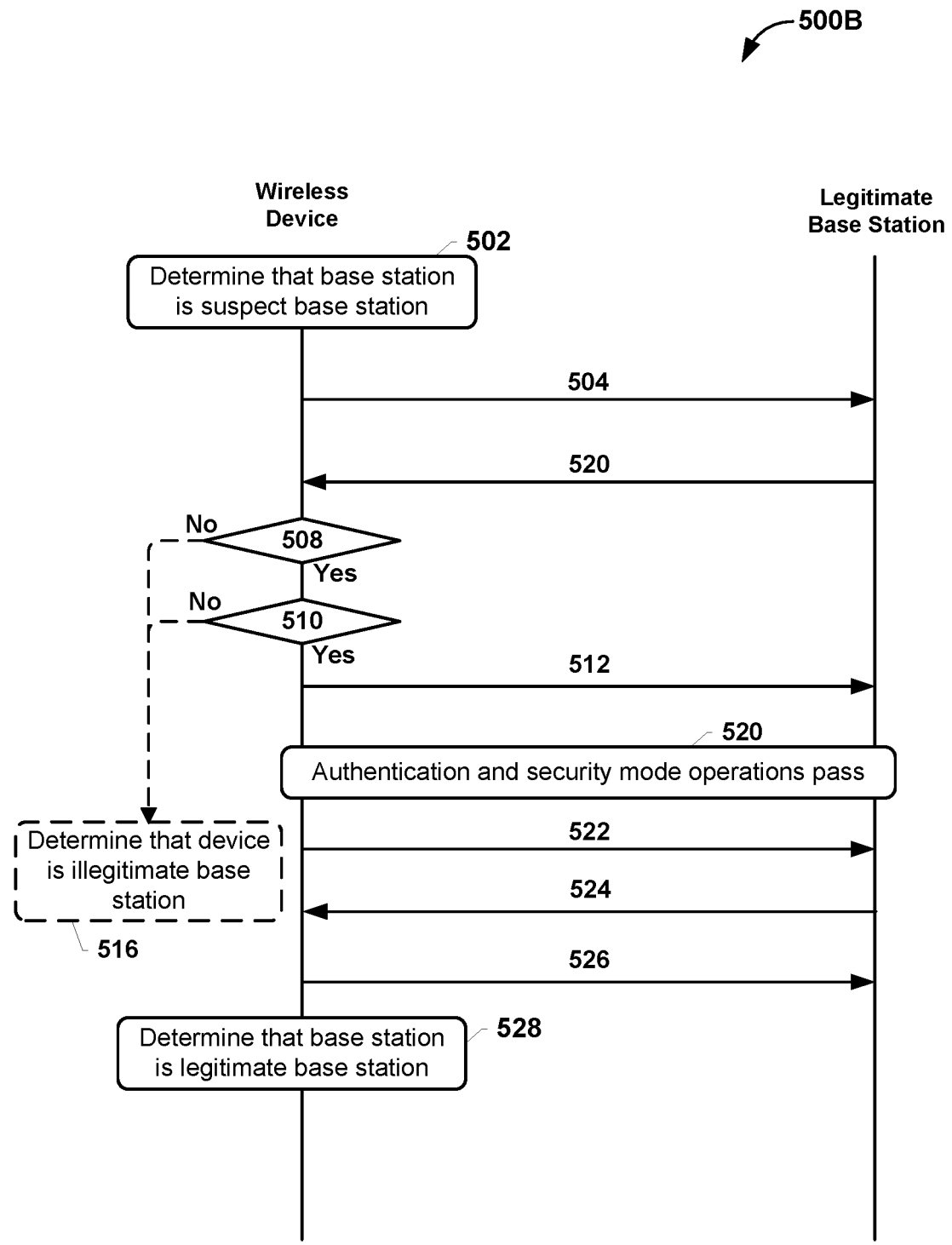

Referring to FIG. 5B, the method 500B may enable a wireless device to identify a legitimate base station. In some embodiments, the method 500B may be used in 4G or 5G network applications (e.g., in an LTE network, a 5G NR network, or another suitable network environment). Operations 502-512 and 516 may include operations and messages similar to like-numbered blocks of the method 500A as described.

In the example illustrated in FIG. 5B, in response to the fabricated message 504, the device sends a response message 520 that includes an identity request message. Such an identity request message could indicate that the device is a legitimate base station depending upon previous communications with the wireless device, but could also indicate that the device is a relatively sophisticated illegitimate base station configured to provide an expected or anticipated response (e.g., an identity request message). Therefore, in response to receiving an identity request message, the processor of the wireless device may send an identity response message 512, and the processor may perform authentication and security mode operations 520. In this example, the authentication and security mode operations pass.

In some embodiments, the processor of the wireless device may send a location update request 522 to the base station. In response to a location update request, a legitimate base station would send a location update response 524, which may include a TMSI that the base station has assigned to the wireless device. In response to receive the location update response 524, the processor of the wireless device may send a message 526 to the base station including an indication that TMSI reallocation is complete. Based on this exchange of messages, the processor of the wireless device may determine that the base station is a legitimate base station in operation 528. In some embodiments, the wireless device may simulate a removal and re-insertion of a universal integrated circuit card (UICC) containing a universal SIM (USIM) card in response to determining that the device is a legitimate base station.

Figure 5C:
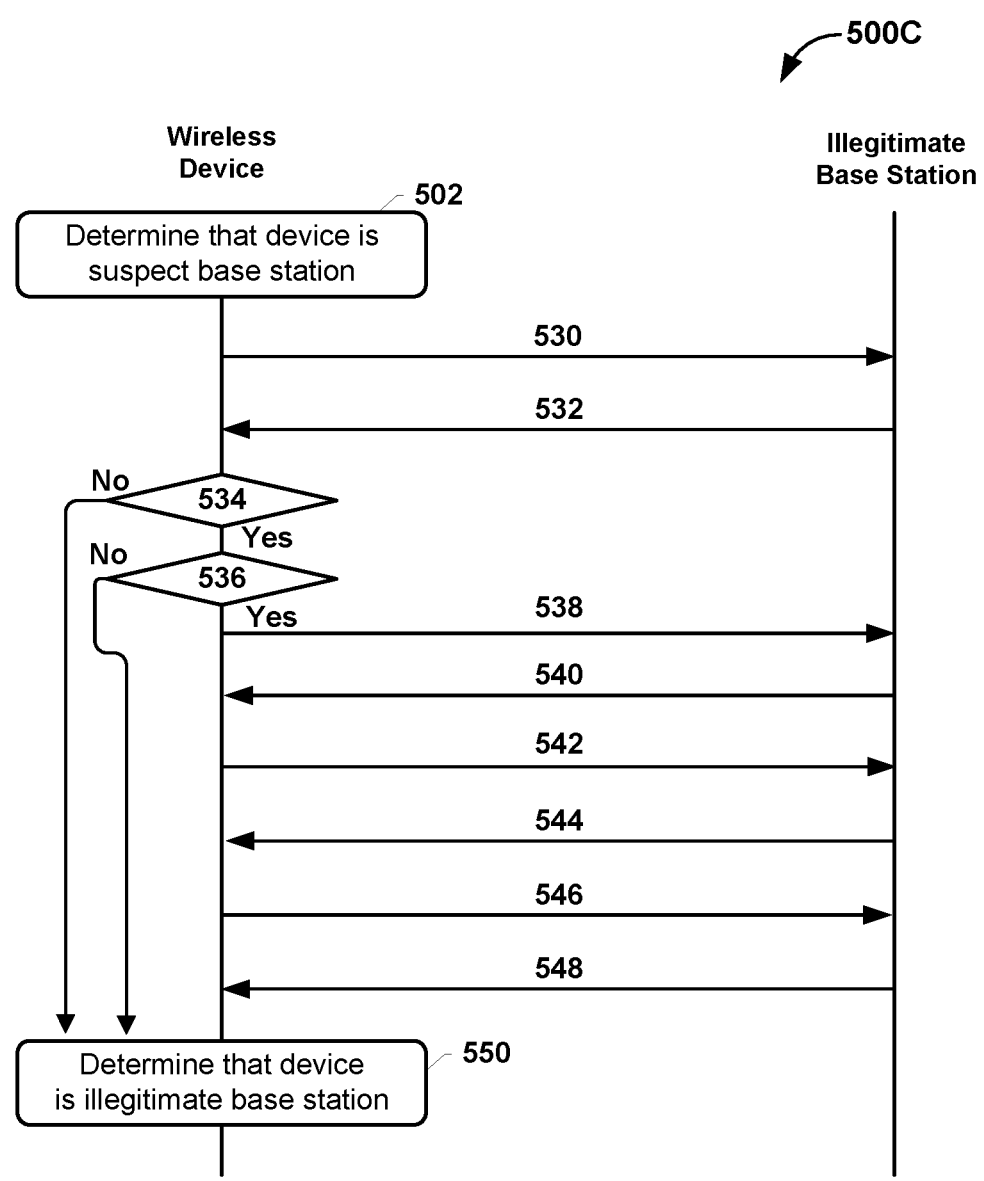

FIG. 5C illustrates communications 500C that may be exchanged between a wireless device and a device that may enable a wireless device processor to determine that the device is an illegitimate base station. In some embodiments, the method 500C may be used in 3G network applications (e.g., in a GSM network or another suitable network environment).

Operation 502 may include operations similar to the like-numbered block of the method 500A as described. For example, the wireless device may have already performed one or more communication operations, such as a random access channel (RACH) procedure, or may have already exchanged one or more messages with the device, and based on such dictation operations and/or messages, the processor of the wireless device may determine that the device is a suspect base station.

In response to determining that the device is a suspect base station, the processor of the wireless device may send a service request message 530 to the device. For example, the service request message 530 may include a mobility management service request. In some embodiments, the service request message may include a fabricated TMSI or fabricated Signed RESponse (SRES) message.

The other device (in this example, an illegitimate base station) may provide a response message 532, and in determination block 534, the processor of the wireless device may determine whether the response message 532 includes a service reject message, which would be the appropriate response to the service request message. For example, the processor of the wireless device may expect a legitimate base station to include a service reject message in the response message 532, whereas a relatively unsophisticated illegitimate base station might send a response that does not include a service reject message. Such a response would immediately expose the device as an illegitimate base station.

In response to determining that the response message 532 does not include a service reject message (i.e., determination block 534="No"), the processor of the wireless device may determine that the device is an illegitimate base station in block 550, and perform a protective action, such as one or more operations of block 414 of the method 400 as described with reference to FIG. 4.

In response to determining that the response message 532 does include a service reject message (i.e., determination block 534="Yes"), the processor may determine whether the wireless device has previously sent an IMSI to the device in determination block 536. In some embodiments, a threat determination algorithm executing on the wireless device may determine whether the wireless device has previously sent the IMSI to the device.

In response to determining that the wireless device has not previously sent an IMSI to the device (i.e., determination block 536="No"), the processor may determine that the device is an illegitimate base station in block 550, and perform a protective action, such as one or more operations of block 414 of the method 400 as described with reference to FIG. 4.

A sophisticated illegitimate base station may be configured to respond appropriately to the service request message 530, so positive results from determination blocks 534 and 536 may not be sufficient to confirm that the device is legitimate or illegitimate. Therefore, the wireless device processor may send further test communications. Thus, in response to determining that the wireless device has previously sent an IMSI to the device (i.e., determination block 536="Yes"), the processor may send an attach request message 538 to the device. For example, the processor may send a message including the IMSI (i.e., the previously-sent IMSI).

A legitimate or sophisticated illegitimate base station may send to the wireless device an identity request message 540, to which the processor of the wireless device may respond by sending an identity response message 542. For example, the processor may send a message including the IMSI (i.e., the previously-sent IMSI).

In response to an identity response message 542, a legitimate or sophisticated illegitimate base station may then send to the wireless device an authentication request message 544. Therefore, in response to receiving an authentication request message, the processor of the wireless device may send a fabricated response (RES) message 546 to further test the device. For example, the fabricated response message 546 may include a service request that includes a fabricated security credential. In some embodiments, fabricated response message 546 may include a fabricated cipher key sequence number (CKSN). In some embodiments, the fabricated response message 546 may include a fabricated key set ID.

When the device responds to the fabricated response with a service accept message 548 (e.g., an attach accept message), the processor of the wireless device may determine whether the device is an illegitimate base station in operation 550 based on contents of the attach accept message 548. For example, if the device is an illegitimate base station, the device may not possess a shared secret with the wireless device (e.g., a shared secret k or another similar shared secret value that may be used by a wireless device and a legitimate base station for authentication or other security purposes). In some embodiments, receiving the attach accept message 548 may indicate to the processor of the wireless device that the other device did not recognize the fabricated message, which is a strong indicator that the device is an illegitimate base station.

Figure 5D:
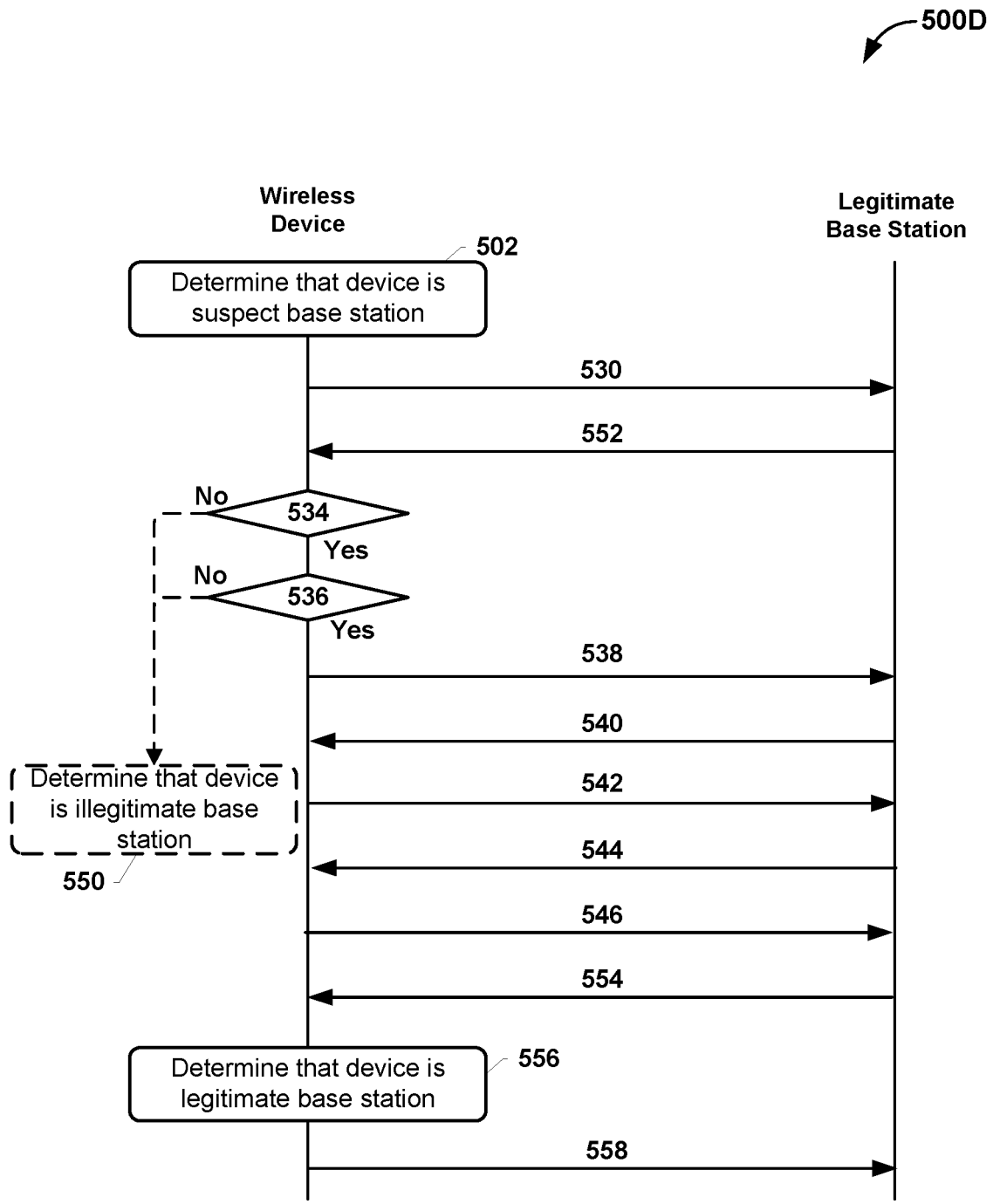

FIG. 5D illustrates communications 500D that may be exchanged between a wireless device and a device that may enable a wireless device processor to confirm that the device is a legitimate base station. Operations 502 and 530-550 may include operations similar to the like-numbered blocks of the methods 500A and 500C as described. In some embodiments, the method 500D may be used in 3G network applications (e.g., in a GSM network or another suitable network environment).

In response to determining that the device is a suspect base station in operation 502 as described with reference to FIG. 5A, the processor of the wireless device may send a service request message 530 as described with reference to FIG. 5C.

A legitimate base station may provide a response message 552 in response to the service request message 530.

In response to determining that the wireless device has previously sent an IMSI to the device (i.e., determination block 536="Yes"), the processor may send an attach request message 538. For example, the processor may send a message including the IMSI (i.e., the previously-sent IMSI).

In some embodiments, the device may send to the wireless device an identity request message 540.

Again, a sophisticated illegitimate base station may be configured to respond appropriately to the service request message 530, so positive results from determination blocks 534 and 536 may not be sufficient to confirm that the device is legitimate or illegitimate. Therefore, the wireless device processor may send further test communications 538 and 542 as described with reference to FIG. 5C. And in response to receiving an authentication request message 544, the processor of the wireless device may send a fabricated response (RES) message 546. For example, the fabricated response message 546 may include a service request that includes a fabricated security credential (e.g., a fabricated CKSN, or a key set ID). In some embodiments, a CKSN or key set ID may enable a legitimate base station to identify a ciphering key (e.g., a ciphering key Kc), which may be stored in memory of the wireless device, without performing an authentication procedure, or without instructing the wireless device to perform an authentication procedure. In some embodiments, the CKSN or key set ID may enable a legitimate base station to identify a ciphering key and an integrity key (e.g., an integrity key IK), which may be stored in the wireless device, without performing or instructing the wireless device to perform an authentication procedure. In some embodiments, the CKSN or key set ID may be allocated by a legitimate base station and sent to the wireless device with an authentication request message, or an authentication and ciphering request message.

A legitimate base station may respond with a service reject message 554 (e.g., an authentication reject message), which the processor of the wireless device may determine to be the proper or expected response to the fabricated response message 546, and therefore determine that the device is a legitimate base station in operation 556. In some embodiments, upon receipt of the authentication reject message 554 and determining that the device is a legitimate base station in operation 556, the processor of the wireless device may abort ongoing signaling procedures, such as EPS Mobility Management (EMM) signaling, and may enter a de-registered state, such as an EMM-DEREGISTERED state. In some embodiments, the processor may set an update status to ROAMING NOT ALLOWED or another similar update status. In some embodiments, the processor may clear one or more stored values from earlier communications with the device, such as a globally unique temporary identifier (GUTI), a tracking area identity (TAI) list, a last visited registered TAI, one or more key set identifiers (KSIASME), or other suitable values.

In some embodiments, the processor of the wireless device may send a re-registration message 558 to the legitimate base station to begin an authorization process for re-registration with the legitimate base station. In some embodiments, the processor may send the re-registration message 558 after performing a soft reset operation, such as temporarily switching off the wireless device, temporarily switching off a universal integrated circuit card (UICC), and/or simulating removal and re-insertion of the UICC containing a universal SIM (USIM) card, as described for block 414 of the method 400 (FIG. 4).

Figure 5E:
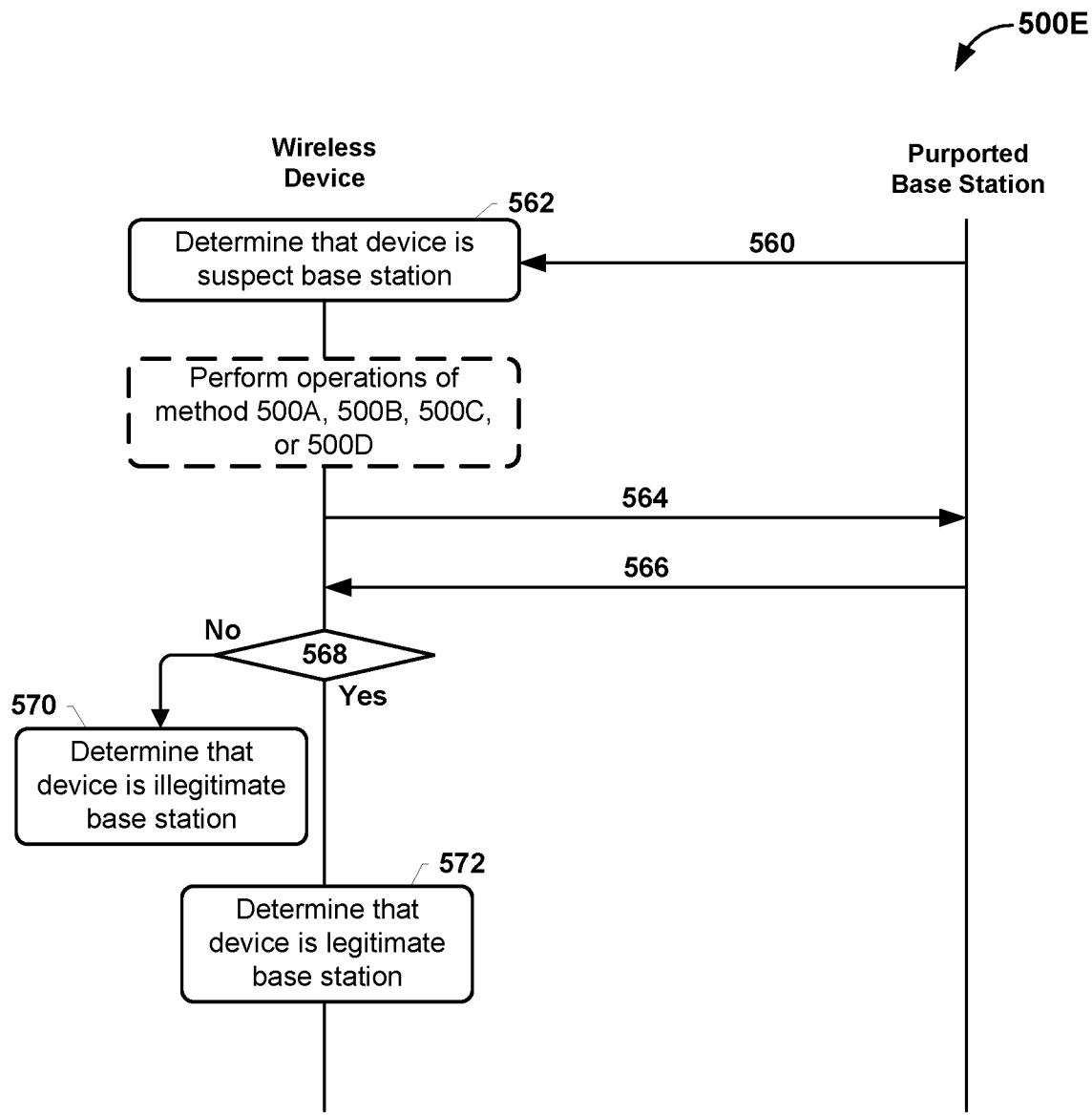

Referring to FIG. 5E, the method 500E may enable a wireless device to identify an illegitimate base station.

In some instances, the wireless device may receive an emergency message 560 from a device purporting to be base station. For example, the emergency message 560 may include a paging message or system message. As another example, the emergency message 560 may include an Earthquake and Tsunami Warning System (ETWS) message. As another example, the emergency message 560 may include a Commercial Mobile Alert System (CMAS) message.

In some embodiments, the processor of the wireless device may determine that the other device is a suspect base station in operation 562 based on information included in the emergency message 560. In some embodiments, the processor may present an alarm based on the emergency message to user (e.g., using an output device such as a display, a speaker, a tactile output device, etc.). In some embodiments, the processor may provide a warning notification that the emergency message is unconfirmed or suspicious, based on the determination that the other device is a suspect base station. The warning notification may be visual, audible, tactile, and the like.

In some embodiments, the processor of the wireless device may optionally perform one or more operations and communications illustrated in FIGS. 5A-5D as described. In some embodiments, the processor of the wireless device may perform the operations of the method 500E in addition to or supplemental to the operations and communications illustrated in FIGS. 5A-5D.

In some embodiments, the processor of the wireless device may send a message 564 invoking a service to the other device, and receive a response message 566 from the device. In some embodiments, the processor of the wireless device may send, with the message 564 or in another message, a request invoking integrity protection as a service from the other device (for example, in 3G, 4G, or 5G implementations). In such embodiments, the processor of the wireless device may use a security context to perform an integrity protection check to test whether the other device is a legitimate or illegitimate base station. In some embodiments, the processor of the wireless device may send, with the message 564 or in another message, a request to invoke a cipher (for example, in a 2G implementation). In determination block 568, the processor of the wireless device may evaluate the received response message 566 to determine whether any include a positive response message. In some situations, the device may transmit more than one response message 566, and the processor may determine whether any one or more of the received response messages is an appropriate response or an inappropriate response to the fabricated message.

In response to determining that the response message 566 does not include a positive response message (i.e., determination block 568="No"), the processor may determine that the device is an illegitimate base station in block 570, and perform a protective action, such as one or more operations of block 414 of the method 400 as described with reference to FIG. 4. In some embodiments, the wireless device may receive no response from the other device (i.e., message 566 is not received within a threshold period of time), which the processor may determine to be a non-positive (or inappropriate) response. In some embodiments, the wireless device may not receive a response from the other device within a threshold period of time (e.g., within a timeout duration), and in response to determining that no response has been received within the threshold period of time the processor may determine that the device is an illegitimate base station.

In some embodiments, a legitimate base station may establish integrity protection (e.g., in 3G or 4G implementations). In contrast, an illegitimate base station will not establish integrity protection, will respond improperly to an integrity protection check, or will send another message that is an inappropriate or incorrect response to the request to establish integrity protection from the wireless device. As another example, in some embodiments, a legitimate base station may correctly use an invoked cipher (e.g., in a 2G implementation). In contrast, an illegitimate base station will be unable to use an invoked cipher correctly.

In response to determining that the response message 566 includes a positive response message (i.e., determination block 568="Yes"), the processor may determine that the device is a legitimate base station in block 572.

FIG. 6A-6E are process flow diagrams illustrating further operations that may be implemented as part of the method 400 for identifying an illegitimate base station in accordance with various embodiments. With reference to FIGS. 1-6E, the methods 600A, 600C, and 600E may be implemented in hardware components and/or software components of a wireless device (e.g., the wireless device 120a-120e, 200, 320), the operation of which may be controlled by one or more processors (e.g., the processors 212, 214, 216, 218, 252, and 260) of the wireless device.

Figure 6A:
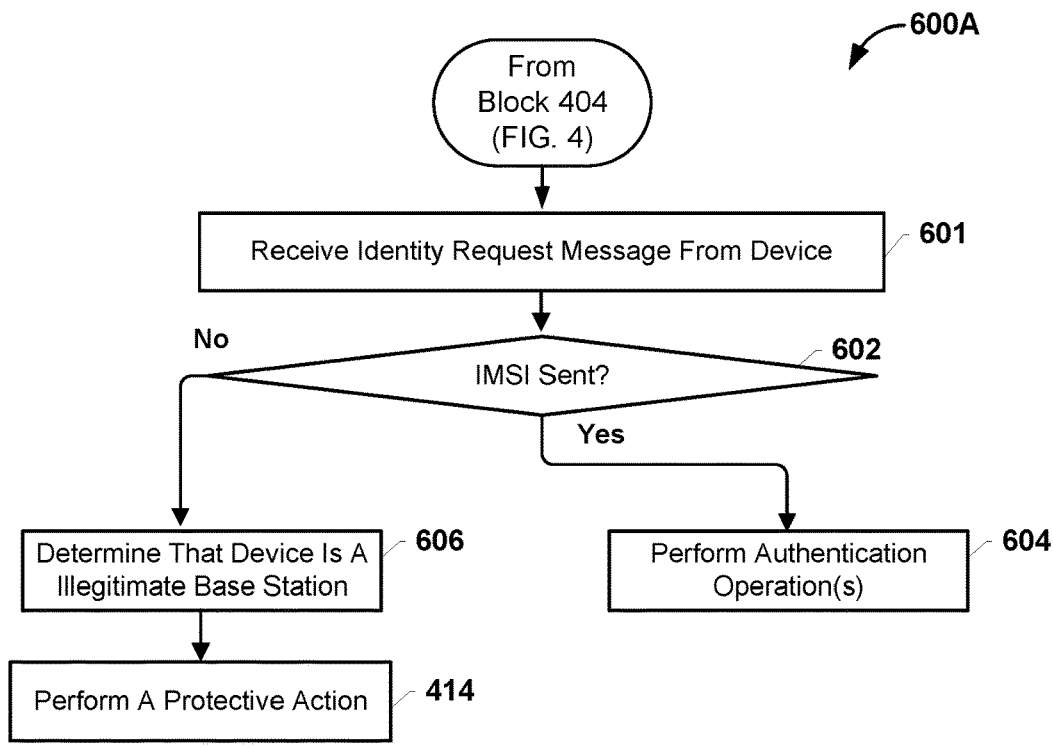
FIG. 6A-6E are process flow diagrams illustrating methods of identifying an illegitimate base station in accordance with various embodiments.

Referring to FIG. 6A, in some embodiments following the operations of block 404 of the method 400 (FIG. 4), if the wireless device receives a response message including an identity request message from the device in block 601, the processor may determine whether the wireless device previously sent an IMSI to the device in determination block 602. In some embodiments, a threat determination algorithm executing on the wireless device may determine whether the wireless device has previously sent the IMSI to the device.

In response to determining that an IMSI was sent to the device (i.e., determination block 602="Yes"), the processor may perform one or more authentication operations to further determine whether the device is a legitimate or illegitimate based station in block 604.

In response to determining that an IMSI was sent to the device (i.e., determination block 602="No"), the processor may determine that the device is an illegitimate base station in block 606.

In response to determining that the device is an illegitimate base station, the processor may implement one or more operations of block 414 of the method 400 to perform a protective action as described with reference to FIG. 4.

Figure 6B:
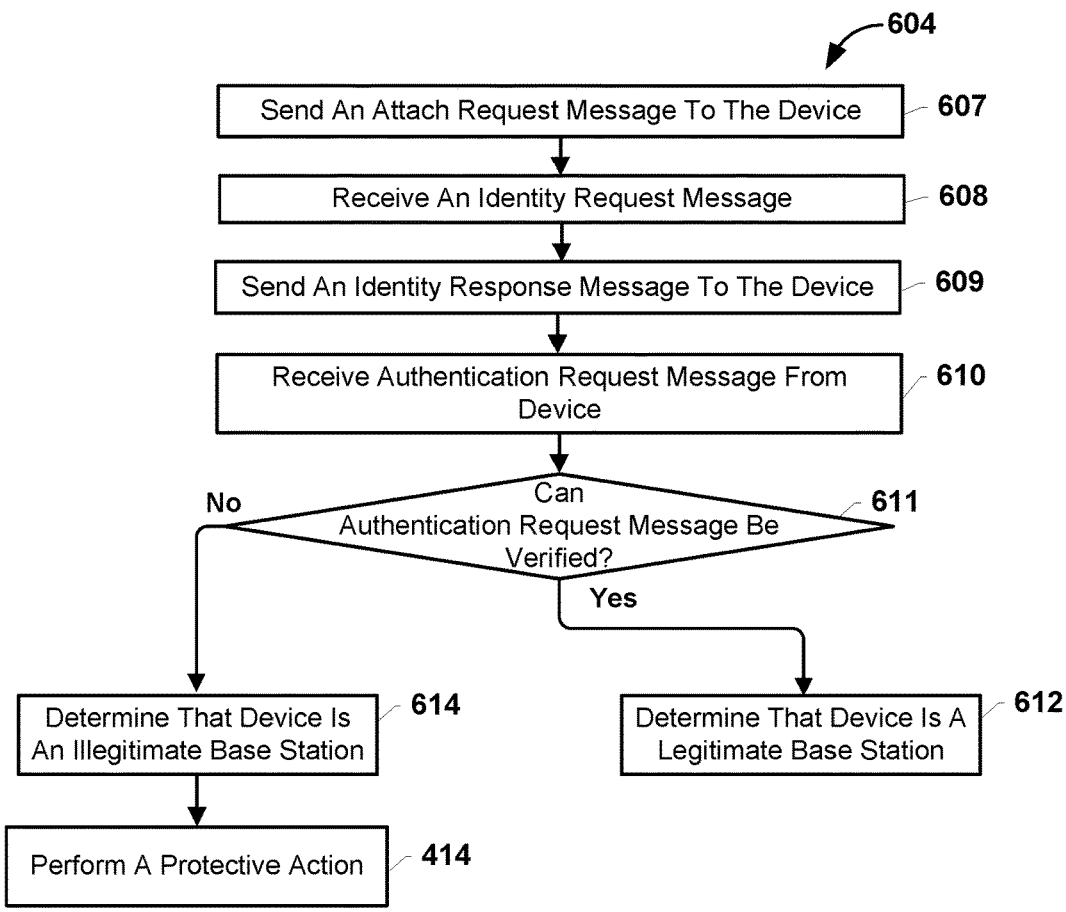

Referring to FIG. 6B, in some embodiments, as part of performing one or more authentication operations in block 604, the processor may send an attach request message to the device in block 607, and in response receive an identity request message in block 608. In response to the identity request message, the processor may send an identity response message to the device in block 609. In block 610, the wireless device may receive an authentication request message from the device.

In determination block 611, the processor may determine whether the authentication request message can be verified. For example, if the device is an illegitimate base station, the device will not possess a shared secret with the wireless device (e.g., a shared secret k or another similar shared secret value that may be used by a wireless device and a legitimate base station for authentication or other security purposes), and therefore the processor of the wireless device will be unable to verify the authentication request message or otherwise authenticate the device.

In response to determining that the authentication request message can be verified (i.e., determination block 611="Yes"), the processor may determine that the device is a legitimate base station in block 612.

In response to determining that the authentication request message cannot be verified (i.e., determination block 611="No"), the processor may determine that the device is an illegitimate base station in block 614.

In response to determining that the device is an illegitimate base station, the processor may implement one or more operations of block 414 of the method 400 to perform a protective action as described with reference to FIG. 4.

Figure 6C:
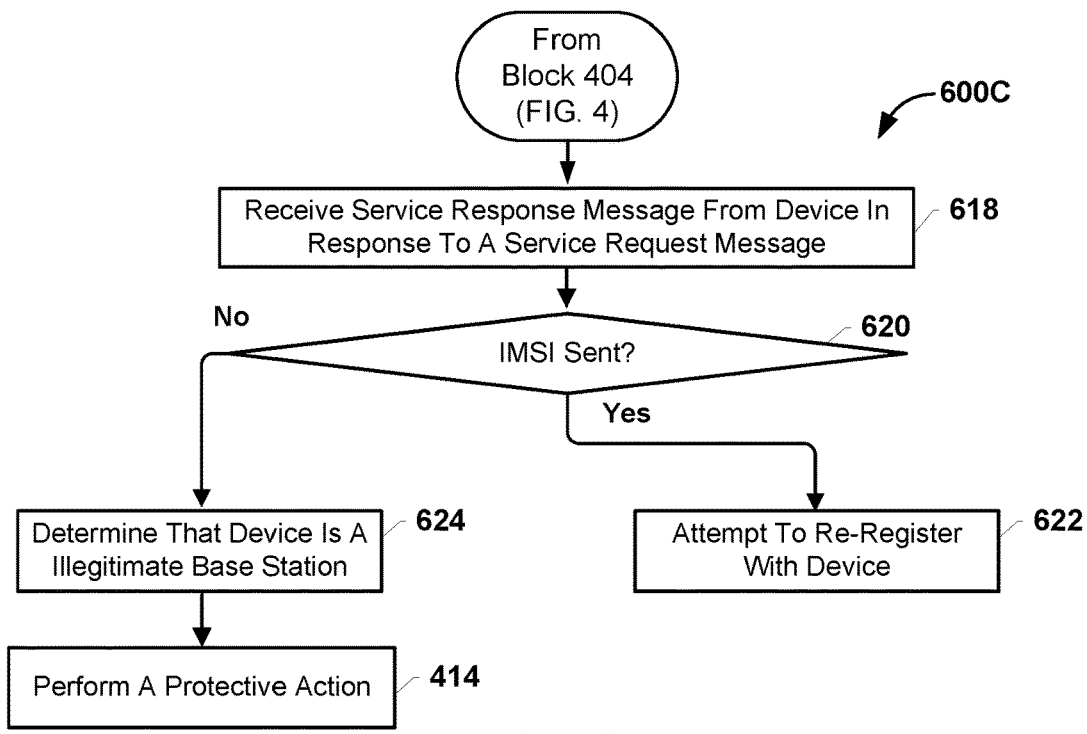

Referring to FIG. 6C, in some embodiments following the operations of block 404 of the method 400 (FIG. 4), if the wireless device receives a response message in response to the wireless device sending a service request message in block 618, the processor may determine whether the wireless device previously sent an IMSI to the device n determination block 620. In some embodiments, a threat determination algorithm executing on the wireless device may determine whether the wireless device has previously sent the IMSI to the device.

In response to determining that an IMSI was sent to the device (i.e., determination block 620="Yes"), the processor may perform one or more operations to further determine whether the device is a legitimate or illegitimate based station by attempting to re-register with the device in block 622.

In response to determining that an IMSI was sent to the device (i.e., determination block 620="No"), the processor may determine that the device is an illegitimate base station in block 624.

In response to determining that the device is an illegitimate base station, the processor may implement one or more operations of block 414 of the method 400 to perform a protective action as described with reference to FIG. 4.

Figure 6D:
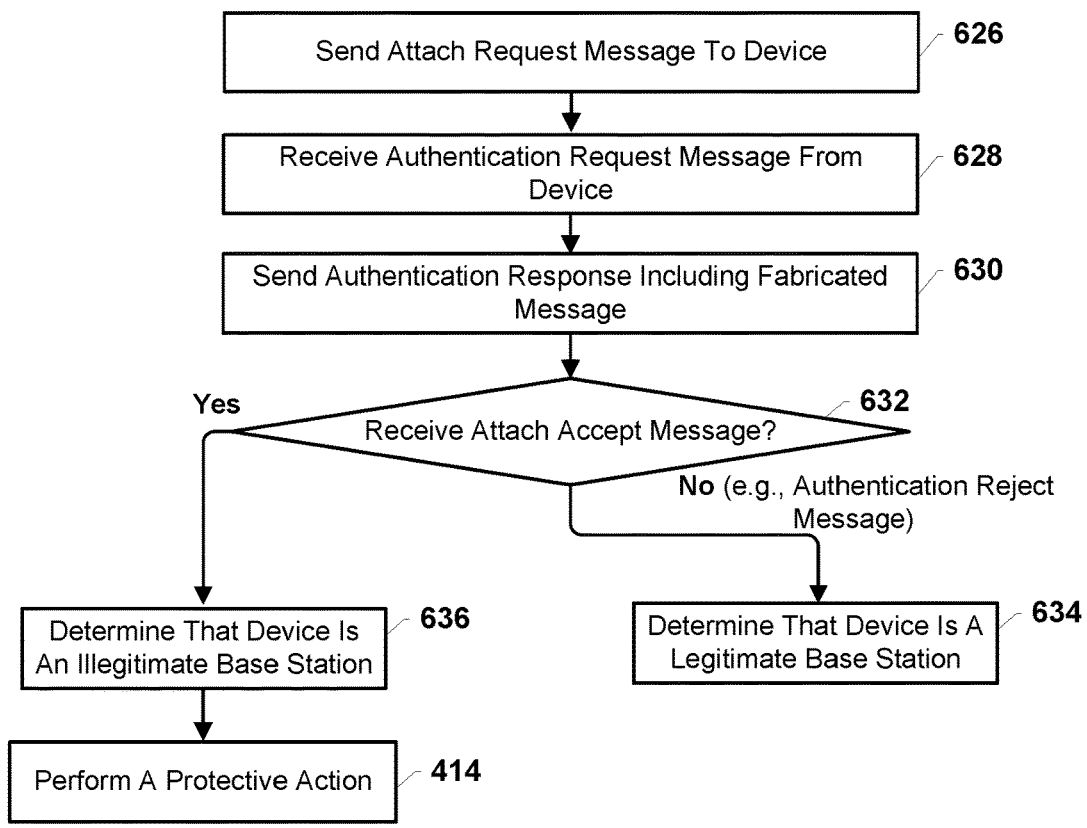

Referring to FIG. 6D, in some embodiments, as part of performing one or more operations to further determine whether the device is a legitimate or illegitimate based station by attempting to re-register with the device in block 622, the processor may send an attach request message to the device in block 626.

In block 628, the processor may receive an authentication request message from the device.

In block 630, the processor may send an authentication response including a fabricated message in block 630. In some embodiments, the fabricated message may include a fabricated response (RES) value. In some embodiments, the fabricated message may include a fabricated CKSN. In some embodiments, the fabricated message may include a fabricated key set ID.

In determination block 632, the processor may determine whether the wireless device received an attach accept message from the device.

In response to determining that the processor has not received an attach accept message (i.e., determination block 632="No"), processor may determine that the device is a legitimate base station in block 634. In some embodiments, determining that the processor has not received the attach accept message may include determining that the processor received an authentication reject message or another suitable message, which would be appropriate responses to a fabricated message response that included a fabricated RES, CKSN value, or key set ID.

In response to determining that the processor received an attach accept message (i.e., determination block 632="Yes"), processor may determine that the device is an illegitimate base station in block 636.

In response to determining that the device is an illegitimate base station, the processor may implement one or more operations of block 414 of the method 400 to perform a protective action as described with reference to FIG. 4.

Figure 6E:
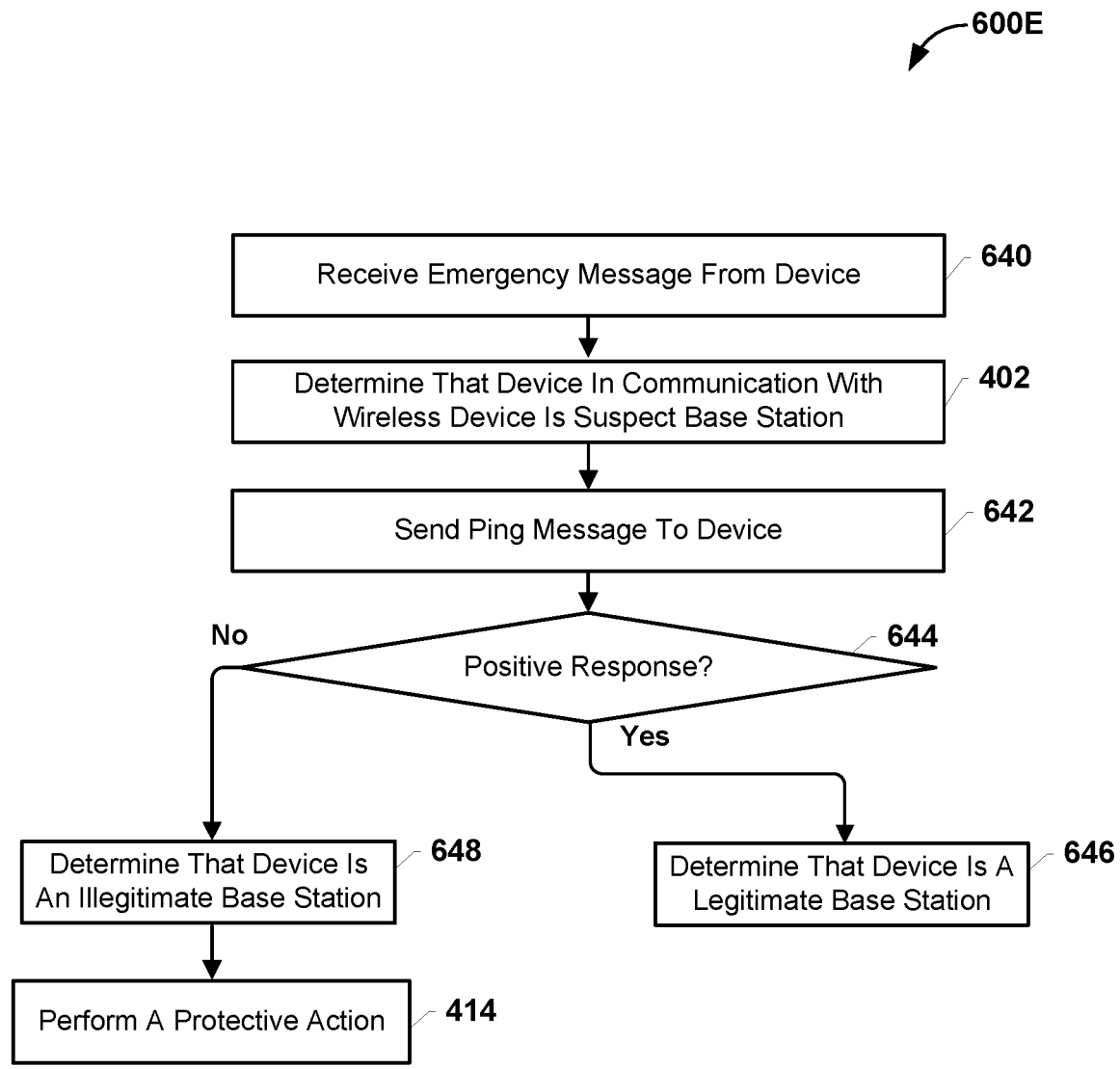

Referring to FIG. 6E, in some embodiments, the processor may receive an emergency message from the device in block 640.

In block 402, the processor may determine that the device in communication with the wireless device is a suspect base station as described for the like numbered block of the method 400 with reference to FIG. 4.

In response to determining that the device in communication with the wireless device is a suspect base station, the processor may send a ping message to the device in block 642.

In determination block 644, the processor may determine whether a response to the ping message sent by the device and received by the wireless device includes a positive response.

In response to determining that the response to the ping message does include a positive response (i.e., determination block 644="Yes"), the processor may determine that the device is a legitimate base station in block 646.

In response to determining that the response to the ping message does not include a positive response (i.e., determination block 644="No"), the processor may determine that the device is an illegitimate base station in block 648. In some embodiments, determining that the response to the ping message does not include a positive response may include determining that the processor has received no response to the ping message (e.g., the processor does not receive a response within a threshold period of time).

In response to determining that the device is an illegitimate base station, the processor may implement one or more operations of block 414 of the method 400 to perform a protective action as described with reference to FIG. 4.

Figure 7:
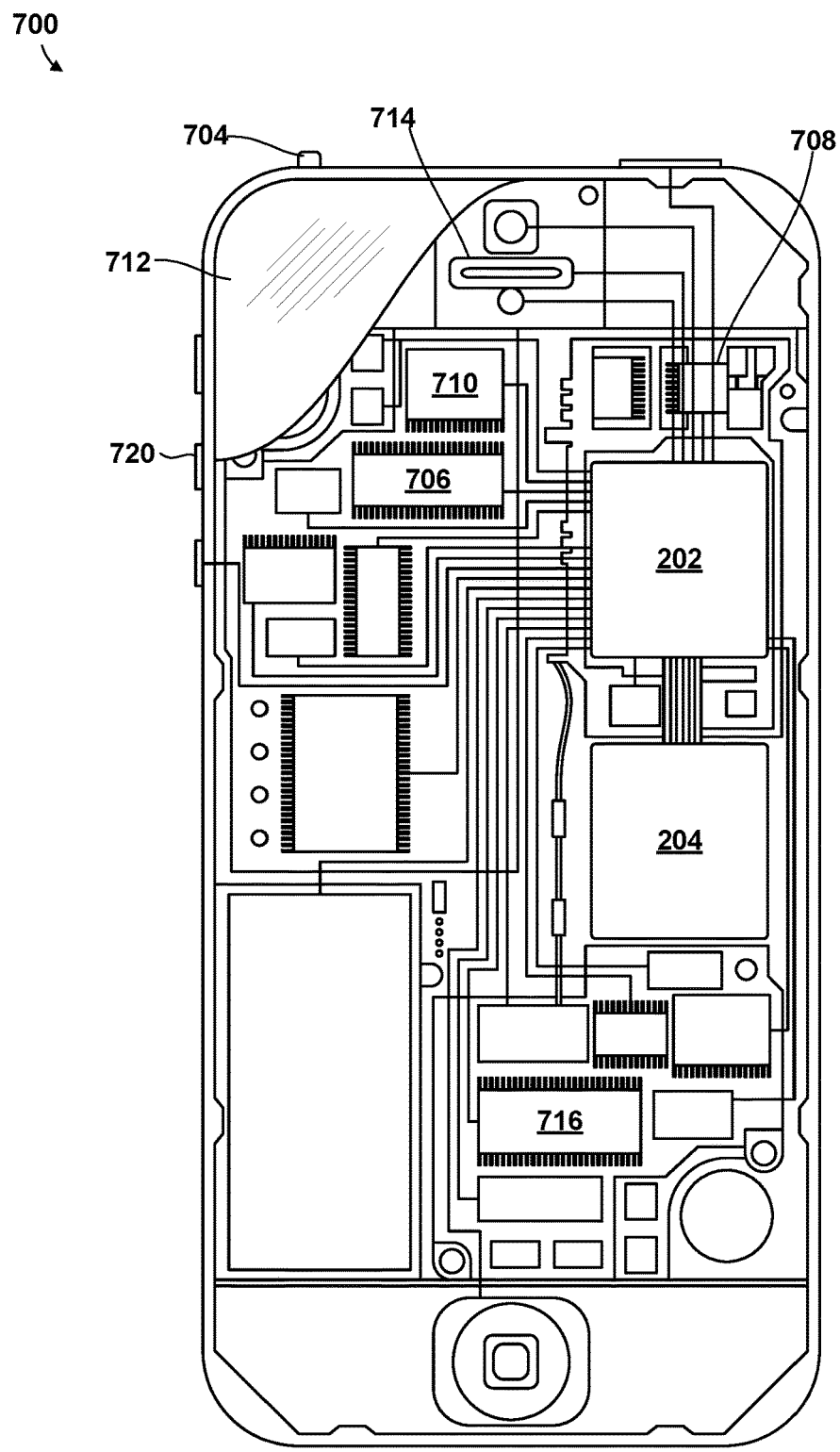

Various embodiments may be implemented on a variety of wireless devices, an example of which is illustrated in FIG. 7 in the form of a smartphone 700. With reference to FIGS. 1-7, the smartphone 700 (e.g., the wireless devices 120a-120e, 200, 320) may include a first SOC 202 (e.g., a SOC-CPU) coupled to a second SOC 204 (e.g., a 5G capable SOC). The first and second SOCs 202, 204 may be coupled to internal memory 706, 716, a display 712, and a speaker 714. Additionally, the smartphone 700 may include an antenna 704 for sending and receiving electromagnetic radiation that may be connected to a wireless data link and/or cellular telephone transceiver 708 coupled to one or more processors in the first and/or second SOCs 202, 204. Smartphones 700 typically also include menu selection buttons or rocker switches 720 for receiving user inputs.

A typical smartphone 700 also includes a sound encoding/decoding (CODEC) circuit 710, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 708 and CODEC 710 may include a digital signal processor (DSP) circuit (not shown separately).

Figure 8:
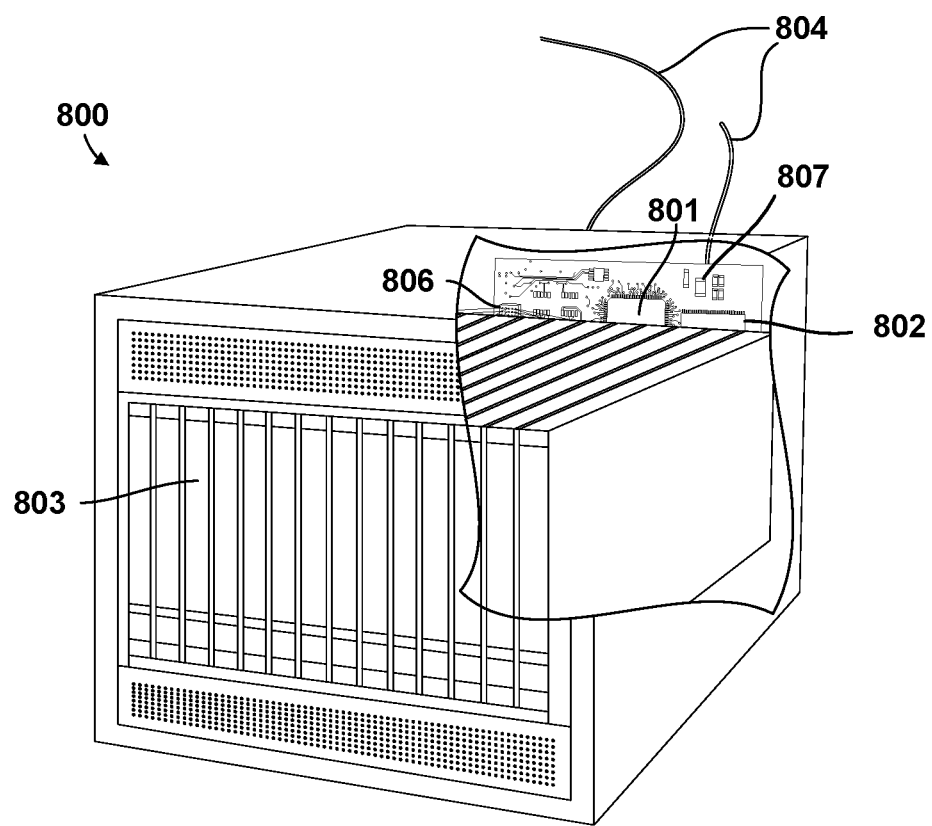
FIG. 8 is a component block diagram of a base station suitable for implementing any of the various embodiments.

Various embodiments may be implemented on a variety of network devices (such as a base station), an example of which is illustrated in FIG. 8 in the form of a network computing device 800 functioning as a network element of a communication network. Such network computing devices may include at least the components illustrated in FIG. 8. With reference to FIGS. 1-8, the network computing device 800 (e.g., the base stations 110, 350) may typically include a processor 801 coupled to volatile memory 802 and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

The processors of the smart phone 700 and the network computing device 800 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 706, 716, 802, 803 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the Claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500A-500E, 600A, 600C, and 600E may be substituted for or combined with one or more operations of the methods 400, 500A-500E, 600A, 600C, and 600E.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of identifying an illegitimate base station performed by a processor of a wireless device, comprising:
sending a fabricated message containing content that is falsified, garbled or otherwise improper to a device in communication with the wireless device in response to determining that the device is a suspect base station;
receiving a response message from the device;
determining whether the response message is an appropriate response or an inappropriate response to the fabricated message, wherein a determination that the response message is an appropriate response is based on a determination that the device has identified the fabricated message as containing content that is falsified, garbled or otherwise improper, and a determination that the response message is an inappropriate response is based on a determination that the device has not identified the fabricated message as containing content that is falsified, garbled or otherwise improper;
determining that the device is an illegitimate base station in response to determining that the response message is an inappropriate response to the fabricated message; and
performing a protective action in response to determining that the device is an illegitimate base station.

2. The method of claim 1, wherein the fabricated message comprises an area update message that includes a fabricated Temporary Mobile Subscriber Identity (TMSI).

3. The method of claim 2, wherein the fabricated TMSI is a fabricated TMSI without integrity protection, and wherein:
an appropriate response comprises an identity request message; and
an inappropriate response comprises a message that does not include an identity request message.

4. The method of claim 1, further comprising:
determining whether an International Mobile Subscriber Identity (IMSI) was sent to the device in response to receiving a message from the device; and
performing one or more authentication operations in response to determining that an IMSI was sent to the device,
wherein determining that the device is an illegitimate base station in response to determining that the response message is an inappropriate response to the fabricated message comprises determining that the device is an illegitimate base station in response to determining that an IMSI was not sent to the device.

5. The method of claim 4, wherein when the message received from the device is an identity request message performing one or more authentication operations comprises:
receiving an authentication request message from the device;
determining whether the authentication request message can be verified;
determining that the device is a legitimate base station in response to determining that the authentication request message can be verified; and
determining that the device is an illegitimate base station in response to determining that the authentication request message cannot be verified.

6. The method of claim 1, wherein:
sending the fabricated message comprises sending a service request message that includes at least one of a fabricated response (RES) value, a fabricated cipher key sequence number (CKSN), or a key set identifier (ID);
the appropriate response comprises a service reject message; and
the inappropriate response comprises a service accept message.

7. The method of claim 6, further comprising:
determining whether an International Mobile Subscriber Identity (IMSI) was sent to the device; and
attempting to re-register with the device in response to determining that an IMSI was sent to the device,
wherein determining that the device is an illegitimate base station in response to determining that the response message is an inappropriate response to the fabricated message comprises determining that the device is an illegitimate base station in response to determining that an IMSI was not sent to the device.

8. The method of claim 7, wherein:
sending the fabricated message to the device comprises sending an authentication response including the fabricated message;
attempting to re-register with the device comprises:
sending an attach request message to the device; and
receiving an authentication request from the device; and
determining that the device is an illegitimate base station in response to determining that the response message is an inappropriate response to the fabricated message comprises determining that the device is an illegitimate base station in response to determining that the response message includes an attach accept message, the method further comprising determining that the device is a legitimate base station in response to determining that the response message includes an authentication reject message.

9. The method of claim 1, further comprising:
receiving an emergency message from the device; and
sending a message invoking a service to the device;
wherein determining that the device is an illegitimate base station in response to determining that the response message is an inappropriate response to the fabricated message comprises determining whether the device is an illegitimate base station based on a response to the message invoking the service that is received from the device.

10. The method of claim 9, further comprising:
determining that the device is a legitimate base station in response to determining that the response to the message invoking the service includes a positive response.

11. The method of claim 10, further comprising:
performing a soft reset operation in response to determining that the device is a legitimate base station.

12. The method of claim 10, further comprising:
simulating removal and re-insertion of a universal integrated circuit card (UICC) containing a universal SIM (USIM) card in response to determining that the device is a legitimate base station.

13. The method of claim 1, wherein:
sending a fabricated message to the device comprises sending one or more fabricated messages to the device;
receiving a response message from the device comprises receiving more than one response from the device; and
determining whether the response message is an inappropriate response to the fabricated message comprises determining whether any one or more of the received response messages is an inappropriate response.

14. A wireless device, comprising:
a wireless transceiver; and
a processor coupled to the wireless transceiver and configured with processor-executable instructions to perform operations comprising:
sending a fabricated message containing content that is falsified, garbled or otherwise improper to a device in communication with the wireless device in response to determining that the device is a suspect base station;
receiving a response message from the device;
determining whether the response message is an appropriate response or an inappropriate response to the fabricated message, wherein a determination that the response message is an appropriate response is based on a determination that the device has identified the fabricated message as containing content that is falsified, garbled or otherwise improper, and a determination that the response message is an inappropriate response is based on a determination that the device has not identified the fabricated message as containing content that is falsified, garbled or otherwise improper;
determining that the device is an illegitimate base station in response to determining that the response message is an inappropriate response to the fabricated message; and
performing a protective action in response to determining that the device is an illegitimate base station.

15. The wireless device of claim 14, wherein the processor is configured with processor-executable instructions to perform operations such that sending the fabricated message to the device comprises sending an area update message that includes a fabricated Temporary Mobile Subscriber Identity (TMSI).

16. The wireless device of claim 15, wherein the processor is configured with processor-executable instructions to perform operations further comprising:
fabricating the TMSI without integrity protection;
determining that the response message is an appropriate response in response to determining that the response message comprises an identity request message; and
determining that the response message is an inappropriate response in response to determining that the response message comprises an identity request message.

17. The wireless device of claim 14, wherein the processor is configured with processor-executable instructions to perform operations further comprising:
determining whether an International Mobile Subscriber Identity (IMSI) was sent to the device in response to receiving a message from the device; and
performing one or more authentication operations in response to determining that an IMSI was sent to the device,
wherein the processor is configured with processor-executable instructions to perform operations such that determining that the device is an illegitimate base station in response to determining that the response message is an inappropriate response to the fabricated message comprises determining that the device is an illegitimate base station in response to determining that an IMSI was not sent to the device.

18. The wireless device of claim 17, wherein the processor is configured with processor-executable instructions to perform one or more authentication operations in response receiving an identity request message from the device comprising:
receiving an authentication request message from the device;
determining whether the authentication request message can be verified;
determining that the device is a legitimate base station in response to determining that the authentication request message can be verified; and determining that the device is an illegitimate base station in response to determining that the authentication request message cannot be verified.

19. The wireless device of claim 14, wherein the processor is configured with processor-executable instructions to perform operations such that:
sending the fabricated message comprises sending a service request message that includes at least one of a fabricated response (RES) value, a fabricated cipher key sequence number (CKSN), or a key set ID;
the appropriate response comprises a service reject message; and
the inappropriate response comprises a service accept message.

20. The wireless device of claim 19, wherein the processor is configured with processor-executable instructions to perform operations further comprising:
determining whether an International Mobile Subscriber Identity (IMSI) was sent to the device;
attempting to re-register with the device in response to determining that an IMSI was sent to the device; and
determining that the device is an illegitimate base station in response to determining that an IMSI was not sent to the device.

21. The wireless device of claim 20, wherein the processor is configured with processor-executable instructions to perform operations such that:
sending the fabricated message to the device comprises sending an authentication response including the fabricated message;
attempting to re-register with the device comprises:
sending an attach request message to the device; and
receiving an authentication request from the device; and
determining that the device is an illegitimate base station in response to determining that the response message is an inappropriate response to the fabricated message comprises determining that the device is an illegitimate base station in response to determining that the response message includes an attach accept message,
wherein the processor is configured with processor-executable instructions to perform operations further comprising determining that the device is a legitimate base station in response to determining that the response message includes an authentication reject message.

22. The wireless device of claim 14, wherein the processor is configured with processor-executable instructions to perform operations further comprising:
receiving an emergency message from the device; and
sending a message invoking a service to the device,
wherein the processor is configured with processor-executable instructions to perform operations such that determining that the device is an illegitimate base station in response to determining that the response message is an inappropriate response to the fabricated message comprises determining whether the device is an illegitimate base station based on a response to the message invoking the service that is received from the device.

23. The wireless device of claim 22, wherein the processor is configured with processor-executable instructions to perform operations further comprising:
determining that the device is a legitimate base station in response to determining that the response to the message invoking the service includes a positive response.

24. The wireless device of claim 23, wherein the processor is configured with processor-executable instructions to perform operations further comprising:
performing a soft reset operation in response to determining that the device is a legitimate base station.

25. The wireless device of claim 23, wherein the processor is configured with processor-executable instructions to perform operations further comprising:
simulating removal and re-insertion of a universal integrated circuit card (UICC) containing a universal SIM (USIM) card in response to determining that the device is a legitimate base station.

26. The wireless device of claim 14, wherein the processor is configured with processor-executable instructions to perform operations such that:
sending a fabricated message to the device comprises sending one or more fabricated messages to the device;
receiving a response message from the device comprises receiving more than one response from the device; and
determining whether the response message is an inappropriate response to the fabricated message comprises determining whether any one or more of the received response messages in an inappropriate response.

27. A wireless device, comprising:
means for sending a fabricated message containing content that is falsified, garbled or otherwise improper to the device a device in communication with the wireless device in response to determining that the device is a suspect base station;
means for receiving response messages from the device;
means for determining whether a response message received from the device is an appropriate response or an inappropriate response to the fabricated message, wherein a determination that the response message is an appropriate response is based on a determination that the device has identified the fabricated message as containing content that is falsified, garbled or otherwise improper, and a determination that the response message is an inappropriate response is based on a determination that the device has not identified the fabricated message as containing content that is falsified, garbled or otherwise improper;
means for determining that the device is an illegitimate base station in response to determining that the response message is an inappropriate response to the fabricated message; and
means for performing a protective action in response to determining that the device is an illegitimate base station.

28. A non-transitory processor-readable storage medium having stored thereon processor-executable software instructions configured to cause a processor of a wireless device to perform operations for identifying an illegitimate base station, comprising:
sending a fabricated message containing content that is falsified, garbled or otherwise improper to a device in communication with the wireless device in response to determining that the device is a suspect base station;
receiving a response message from the device;
determining whether the response message is an appropriate response or an inappropriate response to the fabricated message, wherein a determination that the response message is an appropriate response is based on a determination that the device has identified the fabricated message as containing content that is falsified, garbled or otherwise improper, and a determination that the response message is an inappropriate response is based on a determination that the device has not identified the fabricated message as containing content that is falsified, garbled or otherwise improper;

determining that the device is an illegitimate base station in response to determining that the response message is an inappropriate response to the fabricated message; and performing a protective action in response to determining that the device is an illegitimate base station.

29. The non-transitory processor-readable storage medium of claim 28, wherein the stored processor-executable software instructions are configured to cause the processor of the wireless device to perform operations further comprising:

determining whether an International Mobile Subscriber Identity (IMSI) was sent to the device in response to receiving a message from the device; and performing one or more authentication operations in response to determining that an IMSI was sent to the device, wherein the stored processor-executable software instructions are configured to cause the processor of the wireless device to perform operations such that determining that the device is an illegitimate base station in response to determining that the response message is an inappropriate response to the fabricated message comprises determining that the device is an illegitimate base station in response to determining that an IMSI was not sent to the device.

30. The non-transitory processor-readable storage medium of claim 29, wherein the stored processor-executable software instructions are configured to cause the processor of the wireless device to perform one or more authentication operations when the message received from the device is an identity request message comprising:

receiving an authentication request message from the device;

determining whether the authentication request message can be verified;

determining that the device is a legitimate base station in response to determining that the authentication request message can be verified; and determining that the device is an illegitimate base station in response to determining that the authentication request message cannot be verified.

* * * * *